United States Patent [19]

Kusano et al.

[11] Patent Number: 5,765,202

[45] Date of Patent: Jun. 9, 1998

[54] PARALLEL COMPUTER OF A DISTRIBUTED STORAGE TYPE

[75] Inventors: Yoshihiro Kusano; Naoki Shinjo; Masayuki Ikeda; Yoshinori Sugisaki; Shin Okada, all of Kawasaki, Japan

[73] Assignee: Fujitsu Limited, Kanagawa, Japan

[21] Appl. No.: 700,835

[22] Filed: Aug. 21, 1996

[30] Foreign Application Priority Data

Sep. 8, 1995 [JP] Japan ................................. 7-231737

[51] Int. Cl.$^6$ ................................................ G06F 12/00
[52] U.S. Cl. ......................... 711/202; 711/1; 711/2; 711/114; 711/173
[58] Field of Search ........................... 711/1, 202, 200, 711/2, 173; 395/421.1, 800.08, 500, 800.18, 800.2, 800.28, 800.14, 416

[56] References Cited

U.S. PATENT DOCUMENTS

| | | | |
|---|---|---|---|
| 4,651,274 | 3/1987 | Omoda et al. | 395/800.08 |
| 4,951,193 | 8/1990 | Muramatsu et al. | 395/416 |
| 5,129,093 | 7/1992 | Muramatsu et al. | 395/800.28 |
| 5,138,704 | 8/1992 | Takahashi et al. | 395/800.2 |
| 5,297,255 | 3/1994 | Hamanaka et al. | 395/800.14 |
| 5,428,801 | 6/1995 | Murano et al. | 395/500 |
| 5,613,138 | 3/1997 | Kishi et al. | 395/800.18 |
| 5,644,749 | 7/1997 | Obayashi | 395/421.1 |

FOREIGN PATENT DOCUMENTS

| | | |
|---|---|---|
| 62-262158 | 11/1987 | Japan. |
| 63-86061 | 4/1988 | Japan. |
| 01-180052 | 7/1989 | Japan. |
| 3-104087 | 5/1991 | Japan. |

*Primary Examiner*—Tod R. Swann
*Assistant Examiner*—Fred F. Tzeng
*Attorney, Agent, or Firm*—Armstrong, Westerman, Hattori, McLeland & Naughton

[57] ABSTRACT

A parallel computer of a distributed storage type, which can omit an overhead time of a processing apparatus required for an address computation, is provided with an array address converting apparatus for generating a PE number of a PE retaining an array element that is an object of an access and an address on storage apparatus of the array element within the PE in each PE. Upon an access to an array element of array data, the processing apparatus activates the array address converting apparatus, a communicating apparatus gives an address on storage apparatus generated by the array address converting apparatus to a PE having a PE number generated by the array address converting apparatus to transmit access demand information for the array element. This parallel computer of a distributed storage type is applicable to a computer system for processing enormous data at a high speed such as numerical calculation, image processing or the like.

38 Claims, 19 Drawing Sheets

IN THE CASE OF BLOCK PARTITIONING

IN THE CASE OF CYCLIC PARTITIONING

11: INTER-PE CHANNEL APPARATUS

| ADDRESS 0 | ACTUAL PE NUMBER OF A PE ALLOCATED TO A VIRTUAL PE NUMBER 0 |
| --- | --- |
| ADDRESS 1 | ACTUAL PE NUMBER OF A PE ALLOCATED TO A VIRTUAL PE NUMBER 1 |
| ⋮ | ⋮ |
| ADDRESS M | ACTUAL PE NUMBER OF A PE ALLOCATED TO A VIRTUAL PE NUMBER M |

M IS A MAXIMUM VALUE OF A VIRTUAL PE NUMBER

FIG.22
RELATED ART

| ADDRESS | MAIN STORAGE OF PE#0 | MAIN STORAGE OF PE#1 | MAIN STORAGE OF PE#2 | MAIN STORAGE OF PE#3 |
|---|---|---|---|---|
| 10000 | A(1) | A(26) | A(51) | A(76) |
| 10001 | A(2) | A(27) | A(52) | A(77) |
| 10002 | A(3) | A(28) | A(53) | A(78) |
| -- | -- | -- | -- | -- |
| 10024 | A(25) | A(50) | A(75) | A(100) |

PARALLEL COMPUTER OF A DISTRIBUTED STORAGE TYPE

BACKGROUND OF THE INVENTION

1) Field of the Invention

The present invention relates to a parallel computer which operates plural processor elements in parallel in order to process enormous data at a high speed such as numerical calculation, image processing, or the like. In particular, the present invention relates to a parallel computer of a distributed storage type in which each storage stores a partition of array data, and conducts a process on the array data while transferring the array data among these processor elements.

2) Description of the Related Art

In a general parallel computer, a number of processor elements (abbreviated as PEs, hereinafter) are communicably connected with each other over a channel 200 as shown in FIG. 21, and a process is implemented while data is transferred among these PEs 100 over the channel 200.

Each of the PEs 100 configuring such parallel computer has a main storage apparatus (MS) 101 for storing various data, a processor (a processing apparatus, a CPU) 102 for processing data on the main storage apparatus 101, and an inter-PE communicating apparatus 103 for communicating with another PE 100 over the channel 200.

The parallel computer of a distributed storage type in which array data are partitioned and located in a number of PEs 100 conducts a process on the array data while transferring the array data partitioned and located in the PEs 100 among the PEs 100.

A description will be hereinafter made of general two techniques of partitioning and locating array data. Assuming here that array data is expressed as, for example, A(1:100), and the array data A(1:100) is partitioned and located in four PEs PE#0 through PE#3 as the PEs 100. Incidentally, "A" represents the array data (Array) and the array data A(1:100) is configured with one hundred array elements A(1), A(2), . . . and A(100).

According to a partitioning/locating technique called a block partitioning, as shown in FIG. 22, array data A(1:25) is partitioned and located in the main storage apparatus 101 of the PE#0, array data A(26:50) is partitioned and located in the main storage apparatus 101 of the PE#1, array data A(51:75) is partitioned and located in the main storage apparatus 101 of the PE#2, and array data A(76:100) is partitioned and located in the main storage apparatus 101 of the PE#3, for example. In FIG. 22, one array element has a size of one byte.

According to a partitioning/locating technique called a cyclic partitioning, as shown in FIG. 23, array elements A(1), A(5), A(9), . . . and A(97) are partitioned and located in the main storage apparatus 101 of the PE#0, array elements A(2), A(6), A(10), . . . and A(98) are partitioned and located in the main storage 101 of the PE#1, and array elements A(3), A(7), A(11), . . . and A(99) are partitioned and located in the main storage 101 of the PE#2, and array elements A(4), A(8), A(12), . . . and A(100) are partitioned and located in the main storage 101 of the PE#3, for example. In FIG. 23, one array element has a size of one byte.

The above-mentioned partitioning/locating techniques of partitioning and locating array data used in a parallel computer of a distributed storage type are quite general, which are described in detail in "High Performance Fortran Language Specification" issued by "HIGH PERFORMANCE FORTRAN FORUM" of Rice University, U.S.A.

In the parallel computer of a distributed storage type, if each of the PEs 100 accesses to an array element of array data partitioned and located in plural PEs 100, it is necessary to determine the number (hereinafter called "PE number"; any one of the above #0 through #3, for example) of the PE 100 in which the array element that is an object of the access exists, and an address of the array element that is an object of the access on the main storage apparatus 101 of that PE 100 (hereinafter called an intra-PE address) on the basis of array data access information and array data partition information.

Here, the array data access information is (1) an identifier of array data that is an object of an access (hereinafter expressed as an array identifier), and (2) an index offset from a leading element of the array data to the array element that is an object of the access (hereinafter expressed as an index offset). The array data partition information is (1) a size of one element of the array data (hereinafter, expressed as an element size), (2) a number of dimensions of the array data (hereinafter, expressed as a number of array dimensions), (3) a region of indexes in each dimension (hereinafter, expressed as a region of array indexes in i-dimension), (4) a manner of partitioning in each dimension (hereinafter, expressed as a partitioning manner in i-dimension), (5) a number of partitions in each dimension (hereinafter, expressed as a number of partitions in i-dimension), (6) a value of an increment of a PE number in each dimension (hereinafter, expressed as an incrementing value of a PE number in i-dimension), and (7) an address on the main storage apparatus 101 of the PE 100 of a piece (a partitioned piece) of the partitioned array data (hereinafter, expressed as an address of a partitioned piece).

A PE number and an intra-PE address are calculated by substituting values given as the abovementioned array data access information and array data partition information in prdetermined equations described below. Calculations of the values are heretofore implemented by a software on the processor 102.

In the case where the array data A(1:100) composed of one hundred elements each of which size is one byte is partitioned into blocks corresponding to PEs 100 from the PE#0 to the PE#3, and a leading address of each partitioned piece in the main storage apparatus 101 of each PE 100 is 10000, an access to one array element A(40) of the array data by a certain PE 100 will be described below.

At this time, the array data access information is:

[Access information. Array identifier]=A

[Access information. Index offset]=40−1=39

The array data partition information is:

[Partition information. Element size]=1

[Partition information. Number of array dimensions]=1

[Partition information. Region of array indexes in dimension 1]=1:100

[Partition information. Manner of partitioning in dimension 1]=Block

[Partition information. Partitioned number in dimension 1]=25

[Partition information. Incrementing value of a PE number in dimension 1]=1

[Partition information. Address of a partitioned piece]= 10000

The number of the PE 100 in which the array element A(40) exists is calculated from the following equation:

$$[PE \text{ number}] = [\text{index offset}]/\{([\text{the upper limit of a region}$$
$$\text{of array indexes in dimension 1}] - [\text{a region}$$
$$\text{of array indexes in dimension 1}] + 1)/[\text{the}$$
$$\text{partitioned number in dimension 1}]\} \times [\text{an}$$
$$\text{incrementing value of the } PE \text{ number in}$$
$$\text{dimension 1}]$$
$$= 39/\{(100 - 1 + 1)/4\} \times 1$$
$$= 39/25 \times 1$$
$$= 1$$

An intra-PE address of the array element A(40) is given from the following equation:

$$[\text{intra-}PE \text{ address}] = [\text{an index offset}] \% \{([\text{the upper limit of}$$
$$\text{the region of the array indexes in}$$
$$\text{dimension 1}] - [\text{a region of the array}$$
$$\text{indexes in dimension 1}] + 1)/[\text{the}$$
$$\text{partitioned number in dimension 1}]\} \times$$
$$[\text{an element size}] + [\text{an address of a}$$
$$\text{partitioned piece}]$$
$$= 39\% \{(100 - 1 + 1)/4\} \times 1 + 10000$$
$$= 10014$$

Namely, the address of the array element A(40) becomes an address 10014 on the main storage 101 of the PE#1. Provided that "/" means an integer division (omit the fractions) and "%" means an integer modulo operation.

The above-mentioned address operation is implemented when an access is get to a one-dimensional array. In the case of an access to a multi-dimensional array, it is possible to readily cope with by implementing the above calculation.

The above-mentioned address calculation is implemented when an access is get to one array element of the array data. If an access is continuously get to an array element group A(40)–A(66) of the array data, for example, a leading array element of each PE 100 and the number of array elements that are objects of the access following the leading array element are first calculated, then an address calculation for the leading array element of each PE 100 is implemented to determined one array element similarly to the above example.

By way of an example of the block partitioning shown in FIG. 22, it is possible to calculate a region of transfer of each PE 100 in the following manner if an array element group that is an object of an access is A(40) through A(66).

[Step 1] By applying the above calculation to the array element A(40), it is possible to know that the array element A(40) is stored at an address 10014 of the PE#1.

[Step 2] The number of accesses to the PE#i is given by the following equation:

[the number of accesses to the $PE \#i$]

$$= \{\text{MIN}([\text{the last index offset of an}$$
$$\text{object of an access}], [\text{an index offset}$$
$$\text{of the last element retained in the}$$
$$PE\#i]) - [\text{a leading index that is the}$$
$$\text{object of the access in the } PE\#i] +$$
$$[\text{the access stride}]\}/[\text{the access stride}]$$

Provided that MIN(a,b) expresses a function to extract a smaller value between a and b, and "the last element retained in the PE#i" is the last element of the array data allocated to the PE#i. In the example shown in FIG. 22, the last elements are A(25) in the PE#0, {A(50) in the PE#1, A(75) in the PE#2, and A(100) in the PE#3.

Now, the number of accesses to the PE#1 is calculated using values of the PE#1:

$$[\text{the number of accesses to the } PE\#1] = \{\text{MIN}(65, 49) - 39 + 1\}/1$$
$$= 49 - 39 + 1$$
$$= 11$$

Therefore, it is necessary, in terms of the PE#1, to access to eleven elements with the array element A(40) in the lead, that is, the array elements A(40) through A(50).

Once a leading address of the array element A(40), an access stride and the number of accesses are determined, it is possible to determine addresses of the following array elements A(41), A(42), . . . and A(50) by successively adding an access stride value to the address of the array element A(40).

[Step 3] If the calculations at [Step 1] and [Step 2] are applied assuming that the next array element A(51) is a leading element, it can be known that it is necessary to access to sixteen array elements from the array elements A(51) stored at an address 10000 in the PE#2, that is, the array elements A(51) through A(66), in terms of the PE#2. At [Step 2], [the last index offset that is the object of the access]←[an index offset of the last element retained in the PE#2], that is, 65←74, is established, it can be thus judged that the calculations for all objects of the accesses are completed.

Incidentally, the above calculations are implemented by a software on the processor 101 of the PE 100 which gets an access to the array element group A(40) through A(66).

In the general parallel computer of a distributed type, it is however necessary to implement an address computation as above to array elements that are objects of the accesses on the CPU (processing apparatus) 102 of the PE 100 when the array data partitioned and located in plural PEs 100 are accessed. Such address computation requires a considerable time. In consequence, accessing to array data partitioned and located takes the CPU 102 of the PE 100 a considerable overhead time.

SUMMARY OF THE INVENTION

In the light of the above problem, an object of the present invention is to implement an address computation upon an access to array data partitioned and located independently and in parallel with a process in the processing apparatus so that an overhead time of the processing apparatus required for the address computation may be omitted and an efficiency of the process may be improved.

The present invention therefore provides a parallel computer of a distributed storage type having plural processor elements and a channel communicably connecting the plural processor elements, which partitions and stores array data in the plural processor elements to conduct a process on the array data while transferring the array data among the plural processor elements over the channel, the parallel computer of a distributed storage type comprising each of the processor elements comprising a storage apparatus for storing data, a processing apparatus for conducting a process on data on the storage apparatus, a communicating apparatus for communicating with another processor element over the channel, and an array address 5 converting apparatus for generating a number of a processor element retaining an array element that is an object of an access and an address on storage apparatus of the array element within a processor element retaining the array element on the basis of array data partition information set in response to a control instruction from the processing apparatus and array data access information sent from the processing apparatus in response to an array data access instruction executed by the processing apparatus, if the array data is partitioned into blocks having the same width of the plural processor elements and the processing apparatus accesses to one array element of the array data, the array address converting apparatus comprising a register group in which a size of one element of the array data, a number of array dimensions, a region of array indexes in each dimension, a manner of partitioning in each dimension, the partitioned number in each dimension, a value of an increment of a processor element number in each dimension and an address on storage apparatus of a partitioned array piece are set as the array data partition information, along with an identifier of array data to be an object of an access and an index offset from a leading element of the array data to an array element that is an object of an access as said array data access information, and an arithmetic circuit for generating a processor element number and an address on storage apparatus of the array element that is an object of the access by conducting a predetermined four-rule arithmetic operation on the array data partition information and the array data access information set in the register group, if the processing apparatus makes a store demand for an array element of the array data, the processing apparatus directly notifying a processor element number and an address on storage apparatus generated by the array address converting apparatus to the communicating apparatus to activate the communicating apparatus, and the communicating apparatus giving the address on storage apparatus generated by the array address converting apparatus to a processor element having the processor element number generated by the array address converting apparatus to transmit the store demand for the array element thereto, if said processing apparatus makes a load demand for an array element of said array data, said processing apparatus directly notifying a processor element number and an address on storage apparatus generated by said array address converting apparatus to said communicating apparatus to activate said communicating apparatus, and said communicating apparatus giving the address on storage apparatus gene rated by said array address converting apparatus to a processor element having the processor element number generated by said array address converting apparatus to transmit the load demand for said array element thereto besides writing load data transmitted in response to said load demand into a register in said processing apparatus, the communicating apparatus further operating asynchronously with the processing apparatus to read corresponding load data from the storage apparatus in response to a load demand from another processor element and transferring the load data to another processor element in response to the load demand.

The present invention also provides a parallel computer of a distributed storage type having plural processor elements and a channel communicably connecting the plural processor elements, which partitions and stores array data in the plural processor elements to conduct a process on the array data while transferring the array data among the plural processor elements over the channel, the parallel computer of a distributed storage type comprising each of the processor elements comprising a storage apparatus for storing the partitioned array data, a processing apparatus for conducting a process on data on the storage apparatus, a communicating apparatus for communicating with another processor element over the channel, and an array address converting apparatus for generating a number of a processor element retaining an array element that is an object of an access and an address on storage apparatus of the array element within a processor element retaining the array element on the basis of array data partition information set in response to a control instruction from the processing apparatus and array data access information sent from the processing apparatus in response to an array data access instruction executed by the processing apparatus, if the array data is partitioned into blocks having the same width of the plural processor elements and the processing apparatus accesses to a stride element group, that is, plural array elements arranged at predetermined intervals, of the array data, the array address converting apparatus comprising a register group in which a size of one element of array data, a number of array dimensions, a region of array indexes in each dimension, a manner of partitioning in each dimension, a number of partitions in each dimension, a value of an increment of the processor element number in each dimension, an address on storage apparatus of a partitioned array piece, a stride of the stride element group and the number of elements of the stride element group are set as the array data partition information along with an identifier of array data to be an object of an access and an index offset from a leading element of the array data to a leading element of the stride element group as said array data access information, and an arithmetic circuit for successively generating a processor element number and an address on storage apparatus of each of array elements of the stride element group that is an object of the access by conducting a predetermined four-rule arithmetic operation on the aray data partition information and the array data access information set in the register group, if the processing apparatus makes a store demand for a stride element group of the array data, the processing apparatus directly notifying the processor element number and the address on storage apparatus generated by the array address converting apparatus to the communicating apparatus to activate the communicating apparatus, the communicating apparatus giving the address on storage apparatus generated by the array address converting apparatus to a processor element having the processor element number generated by the array address converting apparatus to transmit the store demand for the stride element group, if the processing apparatus makes a load demand for a stride element group of the array data, the processing apparatus directly notifying a processor element number and an address on storage apparatus generated by the array address converting apparatus to the communicating apparatus to activate the communicating apparatus, the communicating apparatus giving the address on storage apparatus generated by the array address converting apparatus to a processor element having the processor element number generated by the array address converting apparatus to transmit the load demand for the stride element group besides writing load data transferred in response to the load demand into a register in the processing apparatus, the communicating apparatus further operating asynchronously with the processing apparatus to read corresponding load data from the storage apparatus in response to a load demand from another processor element and transferring the load data to another processor element in response to the load demand.

The present invention further provides a parallel computer of a distributed storage type having plural processor elements and a channel communicably connecting the plural processor elements, which partitions and stores array data in the plural processor elements to conduct a process on the array data while transferring the array data among the plural processor elements over the channel, the parallel computer of a distributed storage type comprising each of the processor elements comprising a storage apparatus for storing the partitioned array data, a processing apparatus for conducting a process on data on the storage apparatus, a communicating apparatus for communicating with another processor element over the channel, and an array address converting apparatus for generating a number of a processor element retaining an array element that is an object of an access and an address on storage apparatus of the array element within a processor element retaining the array element on the basis of array data partition information set in response to a control instruction from the processing apparatus and array data access information sent from the processing apparatus in response to an array data access instruction executed by the processing apparatus, if the array data is partitioned into blocks having the same width of the plural processor elements and the processing apparatus accesses to a stride element group, that is, plural array elements arranged at predetermined intervals, of the array data, the array address converting apparatus comprising a register group in which a size of one element of array data, a number of array dimensions, a region of array indexes in each dimension, a manner of partitioning in each dimension, a number of partitions in each dimension, a value of an increment of the processor element number in each dimension, an address on storage apparatus of a partitioned array piece, a stride of the stride element group and the number of elements of the stride element group are set as the array data partition information along with an identifier of array data to be an object of an access and an index offset from a leading element of the array data to a leading element of the stride element group as said array data access information, and an arithmetic circuit for successively generating a processor element number and an address on storage apparatus of each of array elements of the stride element group that is an object of the access by conduting a predetermined four-rule arithmetic operation process on said array data partition information and said array data access information set in said register group, if the processing apparatus makes a store demand for a stride element group of the array data, the processing apparatus directly notifying a processor element number and an address on storage apparatus generated by the array address converting apparatus to the communicating apparatus to activate the communicating apparatus, the communicating apparatus giving the address on storage apparatus generated by the array address converting apparatus to a processor element having the processor element number generated by the array address converting apparatus to transmit the store demand for the stride element group thereto, if the processing apparatus makes a load demand for a stride element group of the array data, the processing apparatus directly notifying a processor element number and an address on the storage apparatus generated by the array address converting apparatus to the communicating apparatus to activate the communicating apparatus, the communicating apparatus giving the address on storage apparatus generated by the array address converting apparatus to a processor element having the processor element number generated by the array address converting apparatus to transmit the load demand for the stride element group besides writing load data transferred in response to the load demand into a register in the processing apparatus, the array address converting apparatus further transferring packet form information including a stride of the stride element group and the number of elements of the stride element group along with the address on storage apparatus generated by the array address converting apparatus to the communicating apparatus, the communicating apparatus operating asynchronously with the processing apparatus besides transferring data in a packet form to another processor element to read out corresponding load data from the storage apparatus in response to a load demand from another processor element to transfer the load data to the another processor element in response to the load demand.

According to the present invention, there is provided a hardware (the array address converting apparatus) for implementing an address computation upon an access to array data separately from the processing apparatus so that the address computation at the time of an access to the array data may be implemented independently from a process in the processing apparatus. This may omit an overhead time of the processing apparatus required for the address computation and improve an efficiency of the process.

BRIEF DESCRIPTION OF THE DRAWINGS

FIG. 22 is a diagram for illustrating an example of a general block partitioning.

DESCRIPTION OF THE PREFERRED EMBODIMENTS (a) Description of Aspects of the Invention FIG. 1 is a block diagram showing an aspect of the present invention (a first invention). In FIG. 1, reference numeral 1 denotes a processor element (hereinafter referred as a PE), reference numeral 2 denotes a channel for communicably connecting plural PEs 1. Array data is partitioned and stored in the plural PEs 1, and a process is conducted on the array data while the array data is transferred among the plural PEs 1 over the channel 2. Namely, the plural PEs 1 and the channel 2 configure a parallel computer of a distributed storage type.

Figure 1:
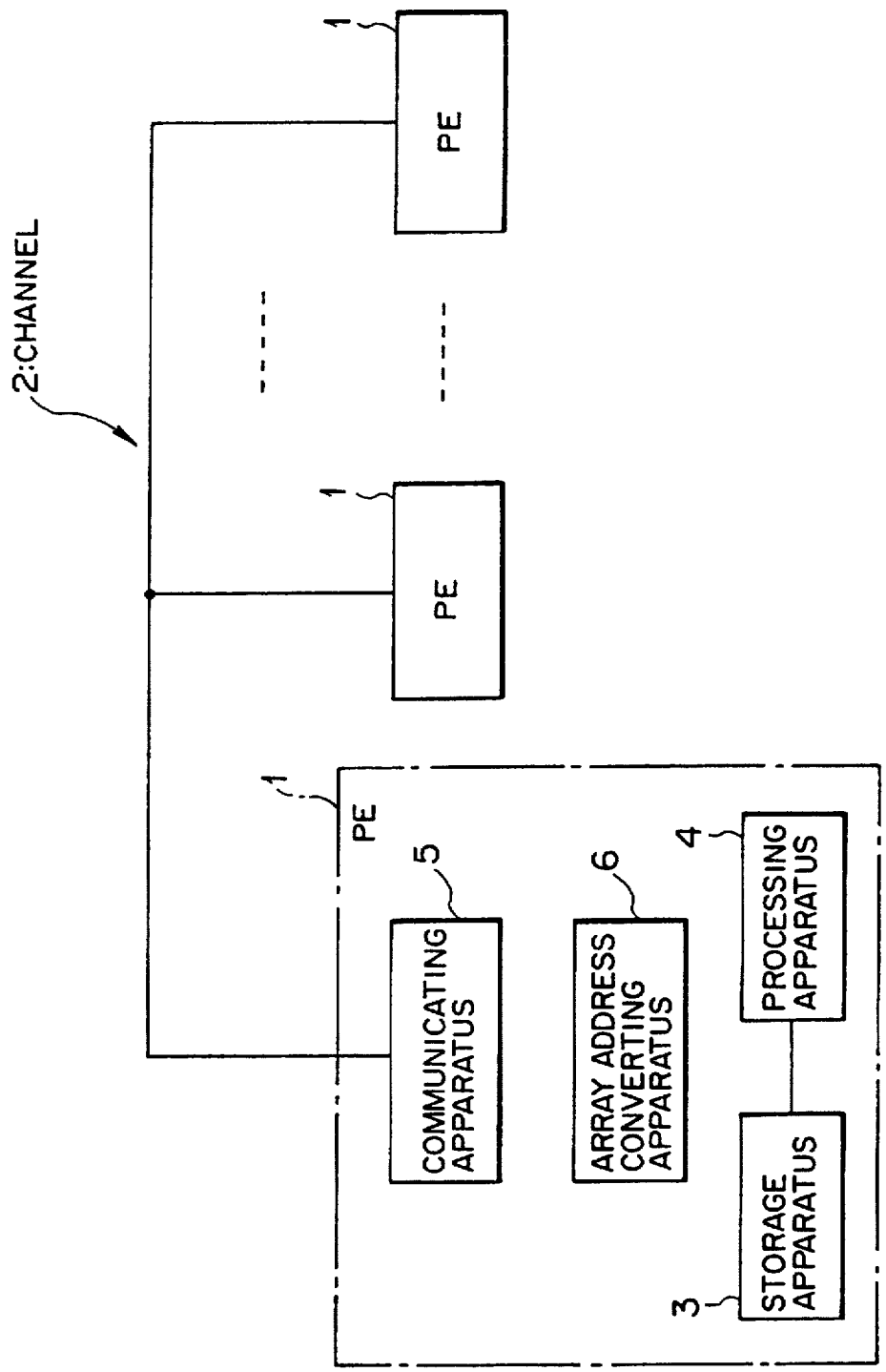
FIG. 1 is block diagram showing an aspect of the present invention.

Each of the PEs 1 configuring the parallel computer of a distributed storage type has a storage apparatus 3, a processing apparatus 4, a communicating apparatus 5 and an array address converting apparatus 6.

The storage apparatus 3 stores data. The processing apparatus 4 conducts a process on data on the storage apparatus 3. The communicating apparatus 5 is served to communicate with another PE 1 over the channel 2.

The array address converting apparatus 6, which is newly added according to this invention, generates a PE number of a PE 1 retaining an array element which is an object of an access and an address on storage apparatus of the array element within the PE 1 retaining the array element on the basis of array data partition information set in response to a control instruction from the processing apparatus 4 and array data access information send from the processing apparatus 4 in response to an array data access instruction executed by the processing apparatus 4.

According to this invention, array data is partitioned into blocks having the same width of plural PEs 1, and the processing apparatus 4 accesses to one array element of the array data. The array address converting apparatus 6 has a register group in which the array data partition information and the array data access information are set, and an arithmetic circuit for generating a PE number and an address on storage apparatus of an array element that is an object of an access by conducing a predetemined four-rule operation process on the array data partition information and the array data access information set in the register group.

As the array data partition information, a size of one element of array data, a number of array dimensions, a region of array indexes in each dimension, a manner of partitioning in each dimension, a number of partitions in each dimension, a value of an increment of a PE number in each dimension, and an address on storage apparatus of a partitioned array piece are set. As the array data access information, an identifier of array data that is an object of an access and an index offset from a leading element of the array data to an array element that is an object of the access are set as well.

If the processing apparatus 4 makes a store demand for an array element of array data, the processing apparatus 4 directly notifies a PE number and an address on storage apparatus generated by the array address converting apparatus 6 to the communicating apparatus 5 to activate the communicating apparatus 5. The communicating apparatus 5 gives the address on storage apparatus generated by the array address converting apparatus 6 to a PE 1 having the PE number generated by the array address converting apparatus 6, and transmits the store demand for the array element.

If the processing apparatus 4 makes a load demand for array element of array data, the processing apparatus 4 directly notifies a PE number and an address on storage apparatus generated by the array address converting apparatus 6 to the communicating apparatus 5 to activate the communicating apparatus 5. The communicating apparatus 5 gives the address on storage apparatus generated by the array address converting apparatus 6 to a PE 1 having the PE number generated by the array address converting apparatus 6 to transmit the load demand for the array element, and writes load data transferred in response to the load demand into a register within the processing apparatus 4.

Further, the communicating apparatus 5 operates asynchronously with the processing apparatus 4. The communicating apparatus 5 reads corresponding load data from the storage apparatus 3 in response to a load demand from another PE 1, and transfers the load data to said another PE 1 in response to the load demand.

In the parallel computer of a distributed storage type according to this invention described above, the array address converting apparatus 6 may implement an address computation (generation of a PE number and an address on storage apparatus) upon an access to array data independently and in parallel with a process by the processing apparatus 4. In addition, it is possible to access to one array element with a single instruction from the processing apparatus 4.

A parallel computer of a distributed storage type according to a second invention is configured similarly to that shown in FIG. 1. According to the second invention, the array data is partitioned into blocks having the same width of plural PEs 1. The processing apparatus 4 accesses to a stride element group of the array data, that is, plural array elements arranged at a predetermined interval (a stride). The array address converting apparatus 6 has a register group in which the array data partition information and the array data access information are set, and an arithmetic circuit for successively generating a PE number and an address on storage apparatus of each of array elements of the stride element group that is an object of the access by conducting a predetermined four-rule operation process on the array data partition information and the array data access information set in the register group.

In the parallel computer of a distributed storage type according to the second invention, a size of one element of array data, a number of array dimensions, a region of array indexes in each dimension, a manner of partitioning in each dimension, a number of partitions in each dimension, a value of an increment of a processor element number in each dimension, an address on storage apparatus of a partitioned array piece, a stride of the stride element group and the number of elements of the stride element group are set as the array data partition information. In addition, an identifier of array data that is an object of an access and an index offset from a leading element of the array data to a leading element of the stride element group are set as the array data access information.

If the processing apparatus 4 makes a store demand for a stride element group of the array data, the processing apparatus 4 directly notifies a PE number and an address on storage apparatus generated by the array address converting apparatus 6 to the communicating apparatus 5 to activate the communicating apparatus 5. The communicating apparatus 5 gives the address on storage apparatus generated by the array address converting apparatus 6 to a PE 1 having the PE number generated by the array address converting apparatus 6, and transmits the store demand for the stride element group.

If the processing apparatus 4 makes a load demand for a stride element group of the array data, the processing apparatus 4 directly notifies a PE number and an address on storage apparatus generated by the array address converting apparatus 6 to the communicating apparatus 5 to activate the communicating apparatus 5. The communicating apparatus 5 gives the address on storage apparatus generated by the array address converting apparatus 6 to a PE having the PE number generated by the array address converting apparatus 6, and transmits the load demand for the stride element group, besides writing load data transferred in response to the load demand into a register within the processor apparatus 4.

Further, the communicating apparatus 5 operates asynchronously with the processing apparatus 4. The communicating apparatus 5 reads corresponding load data from the storage apparatus 3 in response to a load demand from another PE 1, and transmits it to said another PE 1 in response to the load demand.

With the above structure, it is possible to access to stride element group with a single instruction from the processing apparatus 4.

The arithmetic circuit configuring the abovementioned array address converting apparatus 6 may have a two-input adder-subtracter, a control circuit for controlling switching between an adding operation and a subtracting operation of the two-input adder-subtracter, and a selector for selecting data retained in the register group and outputting the selected data to the two-input adder-subtracter. In which case, the control circuit controls switching between the adding operation and the subtracting operation of the two-input adder-subtracter, besides the selector selects appropriate data from the register group and outputs it to the two-input adder-subtracter and the two-input adder-subtracter performs the adding process or the subtracting process, thereby generating a PE number and an address on storage apparatus.

The communicating apparatus 5 may be provided with a PE number converting apparatus having a hardware table (refer to FIG. 20, for example) for storing correspondence between a virtual processor element number and an actual processor element number, which regards a PE number generated by the array address converting apparatus 6 as a virtual PE number to convert the virtual PE number into an actual PE number by retrieving the hardware table, and an intra-PE address converting apparatus (hereinafter called intra-PE address converting apparatus) regarding an address on storage apparatus received from another PE 1 as a virtual address on storage apparatus and converting the virtual address on storage apparatus into an actual address on storage apparatus within own PE 1.

In which case, the virtual PE number generated by the array address converting apparatus 6 is converted into an actual PE number by the PE number converting apparatus of the communicating apparatus 5 when transmitted to another PE 1. If an access demand addressed to own PE 1 is received from another PE 1, a virtual address on storage apparatus (an address generated by the array address converting apparatus 6 of another PE 1) included in the access demand is converted into an actual address on storage apparatus within own PE 1 by the intra-PE address converting apparatus of the communicating apparatus 5.

Further, the processing apparatus 4 reads out a PE number and an address on storage apparatus generated by the array address converting apparatus 6 from the array address converting apparatus 6, activates the communicating apparatus 5 on the basis of the PE number and the address on storage apparatus read out so as to control transmission of the store demand or the load demand by the communicating apparatus 5.

The array address converting apparatus 6 may have a switch for exchanging a PE number and an address on storage apparatus generated by the array address converting apparatus 6 and outputting them. In which case, a PE number and an address on storage apparatus outputted from the array address converting apparatus 6 correspondingly to block partitioning are exchanged by the switch and outputted, whereby a PE number and an address on storage apparatus corresponding to cyclic partitioning may be readily generated.

A parallel computer of a distributed storage type according to a third invention is configured similarly to that according to the second invention. According to the third invention, the array address converting apparatus 6 transfers packet form information including a stride of a stride element group and the number of elements of the stride element group along with addresses on storage apparatus generated by the array address converting apparatus 6 to the communicating apparatus 5, and the communicating apparatus 5 transfers data in a packet form to another PE 1.

With the above structure, it is possible to access to a stride element group with a single instruction from the processing apparatus 4. Particularly, it is unnecessary in this case to generate a PE number and an address on storage apparatus of each array element of the stride element group that is an object of the access by the array address converting apparatus 6 and perform a communicating process by the communicating apparatus 5. It is however possible to put access demand information to be transmitted to a PE 1 into a packet and transmit it in a packet form.

At this time, the packet form information as access demand information may include an address of a leading element of a stride element group and a stride of the stride element group on the storage apparatus 3 of the access demand source PE 1 that are access object address information on the storage apparatus 3 of an access demand source PE 1. The register group configuring the array address converting apparatus 6 may include a register for retaining the access object address information. The arithmetic circuit configuring the array address converting apparatus 6 may generate an address on storage apparatus of the access demand source PE 1 of data that should be read out from the storage apparatus 3 or data that should be written into the storage apparatus 3 on the basis of the access object address information retained in the register group.

If data is transferred in a packet form as stated above, the arithmetic circuit configuring the array address converting apparatus 6 may have a two-input adder-subtracter, a control circuit for controlling switching between an adding operation and a subtracting operation of the two-input adder-subtracter and a selector for selecting data retained in the register group and outputting the selected data to the two-input adder-subtracter, similarly to the above case. In which case, the control circuit controls switching between the adding operation and the subtracting operation of the two-input adder-subtracter, the selector selects appropriate data from the register group and inputs it to the two-input adder-subtracter, and the two-input adder-subtracter performs an adding process or a subtracting process, thereby generating a PE number and an address on storage apparatus.

Further, if data is transferred in a packet form as stated above, the communicating apparatus 5 may have a PE number converting apparatus and an intra-PE address converting apparatus similar to those stated above. In which case, a virtual PE number generated by the array address converting apparatus 6 is converted into an actual PE number by the PE number converting apparatus of the communicating apparatus 5 when transmitted to another PE 1. If an access demand addressed to own PE 1 is received from another PE 1, a virtual address on storage apparatus (an address generated by the array address converting apparatus 6 of said another PE 1) included in the access demand is converted into an actual address on storage apparatus within own PE 1 by the intra-PE address converting apparatus of the communicating apparatus 5.

Still further, if data is transferred in a packet form as stated above, the processing apparatus 4 reads out a PE number and an address on storage apparatus generated by the array address converting apparatus 6 from the array address converting apparatus 6, and activates the communicating apparatus 5 on the basis of the PE number and the address on storage apparatus read out so as to control transmission of the store demand or the load demand by the communicating apparatus 5.

Still further, if data is transferred in a packet form as stated above, the array address converting apparatus 6 may write the packet form information into the storage apparatus 3, and the communicating apparatus 4 may read the packet form information from the storage apparatus 3 to transfer the read packet form information to another PE 1.

By using, at the same time, the register group configuring the array address converting apparatus 6 as a register for temporarily retaining generation progress data of a PE number and an address on storage apparatus by the arithmetic circuit, the processing apparatus 4 may continuously generate a PE number and an address on storage apparatus only by setting initial values necessary for generating the PE number and the address on storage apparatus upon a start of a process without necessity of newly setting the initial values after that.

As stated above in detail, the parallel computer of a distributed storage type according to this invention has a hardware (the array address converting apparatus 6) for conducting an address computation on array data at the time of an access separately from the processing apparatus 4. In consequence, it is possible to conduct an address computation on array data upon accessing to array data independently from a process by the processing apparatus, whereby an overhead time of the processing apparatus 4 required for an address computation may be omitted, and an efficiency of the process may thus be largely improved.

In particular, it is possible to get an access to a single array element with a single instruction from the processing apparatus 4 or an access to a stride element group with a single instruction if array data is partitioned into blocks. According to this invention, a desired address conversion is feasible with a quite simple structure of the arithmetic circuit of the array address converting apparatus 6 configured with one two-input adder-substractor.

By providing the PE number converting apparatus or the intra-PE address converting apparatus in the communicating apparatus 5, it is possible to convert a virtual PE number into an actual PE number or a virtual address on storage apparatus into an actual address on storage apparatus of own PE.

Further, the processing apparatus 4 can activate the communicating apparatus 5 on the basis of a PE number and an address on storage apparatus generated by the array address converting apparatus 6, thereby controlling transmission of a store demand or a load demand by the communicating apparatus 5 so as to communicate with another PE 1.

The switch exchanges a PE number with an address on storage apparatus from array address converting apparatus 6 and outputs them, whereby an address conversion may be done quite easily correspondingly to block partitioning and cyclic partitioning.

If array data is partitioned into blocks, access demand information that should be transmitted to a PE 1 is put into a packet and transmitted it in a packet form, whereby an access to a stride element group is feasible with a single instruction.

At this time, by transferring access object address information on the storage apparatus 3 of an access demand source PE 1 along with the store demand or the load demand, the arithmetic circuit of the array address converting apparatus 6 may generate addresses on storage apparatus of the access demand source PE 1 of data that should be read out from the storage apparatus 3 or data that should be written into the storage apparatus 3 so as to get an access to the storage apparatus 3 quickly.

In the case of transmission in a packet form, a desired address conversion is feasible with a quite simple structure of the arithmetic circuit of the array address converting apparatus 6 configured with one two-input adder-subtracter.

In the case of data transfer in a packet form, the PE number converting apparatus or the intra-PE address converting apparatus provided in the communicating apparatus 5 enable to convert a virtual PE number into an actual PE number or to convert a virtual address on storage apparatus into an actual address on storage apparatus of own PE 1.

Still further, in the case of data transfer in a packet form, the processing apparatus 4 activates the communicating apparatus 5 on the basis of a PE number and an address on storage apparatus generated by the array address converting apparatus 6, thereby controlling transmission of a store demand or a load demand by the communicating apparatus 5 so as to communicate with another PE 1.

Still further, in the case of data transfer in a packet form, the array address converting apparatus 6 may write packet form information into the storage apparatus 3, and the communicating apparatus 5 may read out the packet form information from the storage apparatus 3 and transmit it to another PE 1.

By also using the register group of the array address converting apparatus 6 as a register for temporarily retaining generation progress data of a PE number and an address on storage apparatus, it is possible to continuously generate a PE number and an address on storage apparatus so as to allow efficient address conversion.

(b) Description of a First Embodiment

Figure 2:
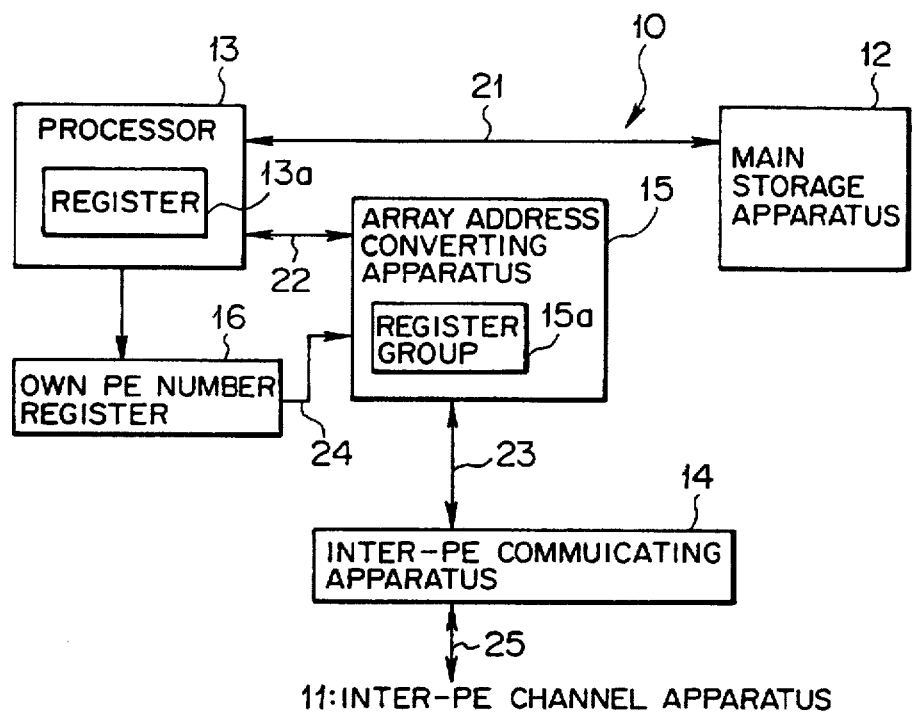
FIG. 2 is a block diagram showing a structure of a processor element in a parallel computer of a distributed storage type according to a first embodiment of the present invention.

FIG. 2 is a block diagram showing a structure of a processor element in a parallel computer of a distributed storage type according to a first embodiment of the present invention. In FIG. 2, reference numeral 10 denotes a processor element (referred as a PE hereinafter) according to the first embodiment. The PE 10 is communicably connected to another plural PEs over an inter-PE channel apparatus (a channel) 11 similarly to that shown in FIG. 1.

In each of embodiments of the present invention which will be described hereinafter, array data is partitioned into blocks of plural PEs 10. A process is conducted on the array data while the array data is transferred among the plural PEs 10 via the channel apparatus 11. In other words, the plural PEs 10 and the channel apparatus 11 configure a parallel computer of a distributed storage type as the embodiment of the present invention.

The PE 10 according to the first embodiment has a main storage apparatus 12, a processor (a CPU, a processing apparatus) 13, an inter-PE communicating apparatus 14, an array address converting apparatus 15 and an own PE number register 16.

The main storage apparatus 12 stores data including partitioned array data. The processor 13 conducts a process on data on the main storage apparatus 12. The inter-PE communicating apparatus 14 communicates with another PE 10 via the channel apparatus 11. Incidentally, the processor 13 has a register (a general purpose register) 13a for storing data necessary for processes, load data, store data and the like.

The array address converting apparatus 15 generates a PE number (a destination PE number) of a PE 10 retaining an array element that is an object of an access and a main storage address (an intra-PE main storage address) of the array element within the PE 10 retaining the array element on the basis of array data partition information set in response to a control instruction from the processor 13 and array data access information sent from the processor 13 in response to an array data access instruction executed by the processor 13, as will be described later.

The array address converting apparatus 15 is provided with a register group 15a to which various data (the array data partition information and the array data access information) necessary for an address generating process described later are set by a software from the processor 13. The register group 15a designates an operation of the array address converting apparatus 15. When the processor 13 executes a special instruction, data is sent from the processor 13 to the register group 15a, then the data is written into the register group 15a.

Figure 3:
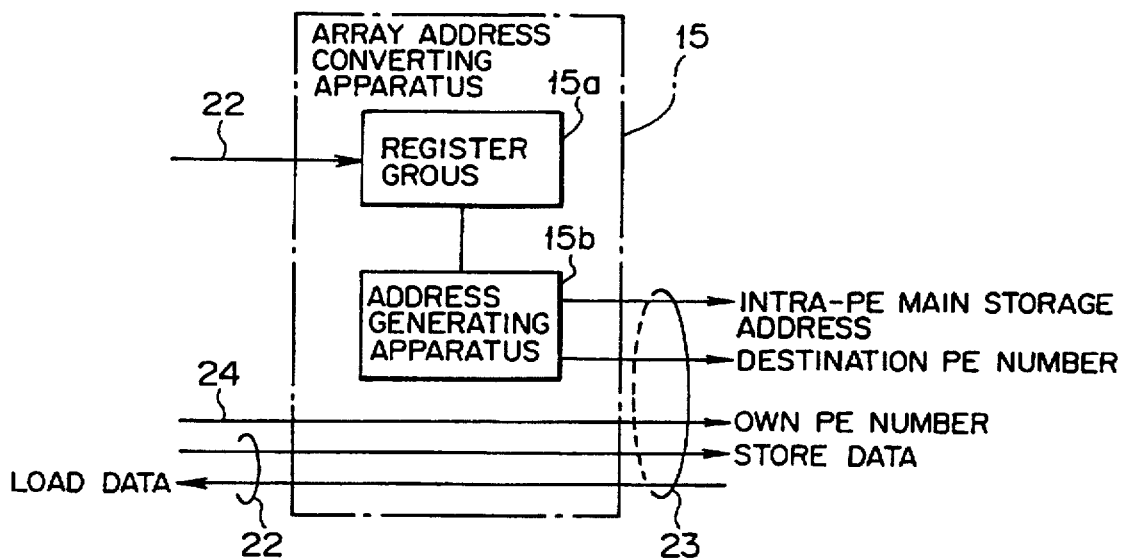
FIG. 3 is a block diagram showing a structure of an array address converting apparatus according to the first embodiment.

As shown in FIG. 3, the array address converting apparatus 15 also has an address generating circuit (an arithmetic circuit) 15b which generates a PE number and an intra-PE main storage address of an array element that is an object of an access by conducting a predetermined four-rule operation process on data set in the register group 15a. A detailed structure of the array address converting apparatus 15 having the register group 15a and the address generating circuit 15b will be described hereinafter with reference to FIGS. 4, 6, 7 and 9.

The own PE number register 16 is set own PE number therein by the processor 13. The own PE number set in the register 16 is sent to the array address converting apparatus 15 over a data line 24, and used as a PE number representing an access demand source upon an access to the array data.

Reference numeral 21 denotes a control/data line connecting the main storage apparatus 12 and the processor 13, over which an access is got from the processor 13 to the main storage apparatus 12, or data is read out from the main storage apparatus 12 or written into the main storage apparatus 12.

Reference numeral 22 denotes a control/data line connecting the processor 13 and the array address converting apparatus 15, over which various data necessary for an address generating process, which will be described hereinafter, is set from the processor 13 to the register group 15a of the array address converting apparatus 15, whereby the processor 13 controls the array address converting apparatus 15. In addition, store data to another PE 10 or load data from another PE 10 is exchanged between the processor 13 and the array address converting apparatus 15 over the control/data line 22.

Reference numeral 23 denotes a control/data line connecting the array address converting apparatus 15 and the inter-PE communicating apparatus 14. When a destination PE number and an intra-PE main storage address are inputted to the communicating apparatus 14 from the array address converting apparatus 15 over the control/data line 23, the communicating apparatus 14 gives the intra-PE main storage address to a PE 10 having the destination PE number to send access demand information thereto. In addition, store data to another PE 10 or load data from another PE 10 is exchanged between the array address converting apparatus 15 and the communicating apparatus 14 over the control/data line 23.

Reference numeral 24 denotes a control/data line connecting the inter-PE communicating apparatus 14 and the inter-PE channel apparatus 11, over which communication is made with another PE 10.

Reference numeral 25 denotes a data line connecting the array address converting apparatus 15 and the own PE number register 16, over which an own PE number set in the register 16 is sent to the array address converting apparatus 15 as described hereinbefore.

Next, a description will be made of a basic operation of the first embodiment with the above structure case by case.

A load demand from the processor 13 to the main storage apparatus 12 is sent to the main storage apparatus 12 over the control/data line 21. Data read out from the main storage apparatus 12 in response to the load demand is written into the register 13a within the processor 13 over the control/data line 21.

The software sets values (array data access information; described later) defining an operation of the array address converting apparatus 15 in advance in the register group 15a in the array address converting apparatus 15 over the control/data line 22. After that, the processor 13 executes a special instruction to utilize the array address converting apparatus 15, thereby giving an array data access instruction to the array address converting apparatus 15 to activate the array address converting apparatus 15.

(a1) A Single Instruction-Single Array Element Access (the case that a single instruction accesses a single array element)
(a1-1) Array Data Transfer between a Register within a Processor of Own PE and a Main Storage Apparatus within Own/Another PE
(a1-1-1) Store Instruction When the processor 13 executes a store instruction to utilize the array address converting apparatus 15, the processor 13 issues an array data access instruction to activate the array address converting apparatus 15 over the control/data line 22. At the same time, the processor 13 reads store data from the register 13a within the processor 13, and sends it to the array address converting apparatus 15 over the control/data line 22.

When receiving the array data access instruction, the array address converting apparatus 15 starts an operation to generate a destination PE number and an intra-PE main storage address using the values set in the register group 15a in the array address converting apparatus 15.

In the case of a single instruction-single array element access, (1) an element size, (2) a number of array dimensions, (3) a region of array indexes in i-dimension, (4) a manner of partitioning in i-dimension, (5) a number of partitions in i-dimension, (6) a value of an increment of a PE number in i-dimension, and (7) a partitioned piece address are set as the array data partition information in the register group 15a of the array address converting apparatus 15, along with (1) an array identifier and (2) an index offset from a leading element of the array data to an array element that is an object of an access as array data access information.

The array address converting apparatus 15 combines the generated PE number and intra-PE main storage address, the own PE number from the register 16 and the store data from the register 13a, and sends them as a store demand (access demand information) to the inter-PE communicating apparatus 14 over the control/data line 23. The above combination of information has thereafter meanings as a destination PE number, a destination intra-PE main storage address, a demand source PE number and store data.

The channel apparatus 11 implements routing for the store demand using the destination PE number according to a communicating process by the communicating apparatus 14, and sends the store demand to a PE 10 having the destination PE number. If the store demand issued by its own PE 10 is addressed to the own PE 10 (if the generated PE number is the same as its own PE number), the store demand is sent from the communicating apparatus 14 to the processor 13 via the control/data line 23, the array address converting apparatus 15 and the control/data line 22, then a storing process is conducted on the main storage apparatus 12 within own PE 10 (that is, a storing process is conducted on the main storage apparatus 12 from the register 13a within own PE 10).

The communicating apparatus 14 of another PE 10 having received the store demand through the channel apparatus 11 sends the store demand to the processor 13. The processor 13 writes the store data at that address into the main storage apparatus 12 using the destination intra-PE main storage address.

After that, the communicating apparatus 14 in another PE 10 combines an acknowledgement of completion of the storing and the demand source PE number, and sends an acknowledge demand to the channel apparatus 11. Information included in the acknowledge demand thereafter has meanings as an acknowledgement of completion of the storing and a destination PE number.

According to the communicating process by the communicating apparatus 14, the channel apparatus 11 implements a routing for the acknowledge demand using the destination PE number, and sends the acknowledgement to the destination PE (that is, the above own PE) 10. The communicating apparatus 14 of own PE 10 having received the acknowledgement reports the acknowledgement to the processor 13, and completes the storing process from the register 13a in the processor 13 of own PE 10 to the main storage apparatus 12 in another PE 10.

(a1-1-2) Load Instruction

When the processor 13 executes a load instruction to utilize the array address converting apparatus 15, the processor 13 issues an array data access instruction to activate the array address converting apparatus 15 over the control/data line 22.

When receiving the array data access instruction, the array address converting apparatus 15 starts an operation to generate a destination PE number and an intra-PE main storage address using values set in the register group 15a in the array address converting apparatus 15.

The array address converting apparatus 15 combines the generated PE number and intra-PE main storage address, and an own PE number from the register 16, and sends them as a load demand (access demand information) to the inter-PE communicating apparatus 14 over the control/data line 23. The above combination of information thereafter has meanings as a destination PE number, a destination intra-PE main storage address, and a demand source PE number.

According to a communicating process by the communicating apparatus 14, the channel apparatus 11 implements a routing for a load demand using the destination PE number, and sends the load demand to a PE 10 having the destination PE number. If the load demand issued by own PE 10 is addressed to the own PE 10 (that is, if the generated PE number is the same as an own PE number), the load demand is sent from the communicating apparatus 14 to the processor 13 via the control/data line 23, the array address converting apparatus 15 and the control/data line 22, and a loading process on the main storage apparatus 12 within own PE 10 (that is, a loading process from the main storage apparatus 12 to the register 13a within own PE 10) is implemented.

The communicating apparatus 14 of another PE 10 having received the load demand via the channel apparatus 11 sends the load demand to the processor 13. The processor 13 reads data at that address in the main storage apparatus 12 using the received destination intra-PE main storage address.

After that, the communicating apparatus 14 in the another PE 10 combines the read data and the demand source PE number, and sends them to the channel apparatus 11. The transmitted information thereafter has meanings as load data and a destination PE number.

According to the communicating process by the communicating apparatus 14, the channel apparatus 11 implements a routing for the load data using the destination PE number, and sends the load data to the destination PE (the above own PE). The communicating apparatus 14 of the PE 10 having received the load data transfers the load data to the processor 13, and the load data is written into the register 13a in the processor 13. Whereby, a loading process from the main storage apparatus 12 in another PE 10 to the register 13a in the processor 13 of own PE 10 is completed.

(a1-2) Array Data Transfer between the Main Storage Apparatus within Own PE and the Main Storage Apparatus in Own/Another PE (a1-2-1) Store Instruction When the processor 13 executes a store instruction to utilize the array address converting apparatus 15, the processor 13 issues an array data access instruction to activate the array address converting apparatus 15 over the control/data line 22. At the same time, the processor 13 reads store data from the main storage apparatus 12 over the control/data line 21 and writes it into the register 13a. After that, the processor 13 transfers the store data in the register 13a to another PE 10 to write it into the main storage apparatus 12 in another PE 10 so as to complete a storing process from the main storage apparatus 12 in own PE 10 to the main storage apparatus 12 in another PE 10, quite similarly to the item (a1-1-1).

(a1-2-2) Load Instruction

When the processor 13 executes a load instruction to utilize the array address converting apparatus 15, the processor 13 issues an array data access instruction to activate the array address converting apparatus 15 over the control/data line 22. After that, load data read out from the main storage apparatus 12 of another PE 10 and written in the register 13a in the processor 13 of its own PE 10 is written into a predetermined address on the main storage apparatus 12 of own PE 10, whereby a loading process from the main storage apparatus 12 in another PE 10 to the main storage apparatus 12 in own PE 10 is completed, quite similarly to the item (a1-1-2).

(a2) Single Instruction-Multiple Array Element Access (the case that a single instruction accesses multiple array elements)

The above description has been made in relation to an access to a single array element with a single instruction (an array data access instruction). In the case of an access to multiple array elements [an array element group; a stride element group, for example, that is, plural array elements arranged at a certain interval (a stride)] with a single instruction, a stride of the stride element group and the number of elements of the stride element group are further set as the array data partition information in the register group 15a of the array address converting apparatus 15 along with (1) an array identifier and (2) an index offset from a leading element of array data to a leading element of the stride element group as the array data access information.

Namely, a register (refer to a register 15G in FIGS. 7 and 9) for designating the number of array elements (the number of elements of a stride element group) that are objects of an access is added to the register group 15a of the array address converting apparatus 15 so as to provide a function to subtract one from the number of elements set in the register each time an address conversion is conducted on one array element (a practical structure thereof will be described in detail later with reference to FIGS. 7 and 9).

To the element number register, the number of elements as the array data access information is set from the processor 13 by a software when a process is initiated. Until a value of the element number register becomes 0, the same operation as described in the above item (1) is repeated so as to execute an access to multiple array elements with a single instruction.

(a3) Detailed Structure of the Array Address Converting Apparatus

Next, a description will be made of a detailed structure of the array address converting apparatus 15 according to this embodiment with reference to FIGS. 4 through 9.

Figure 4:
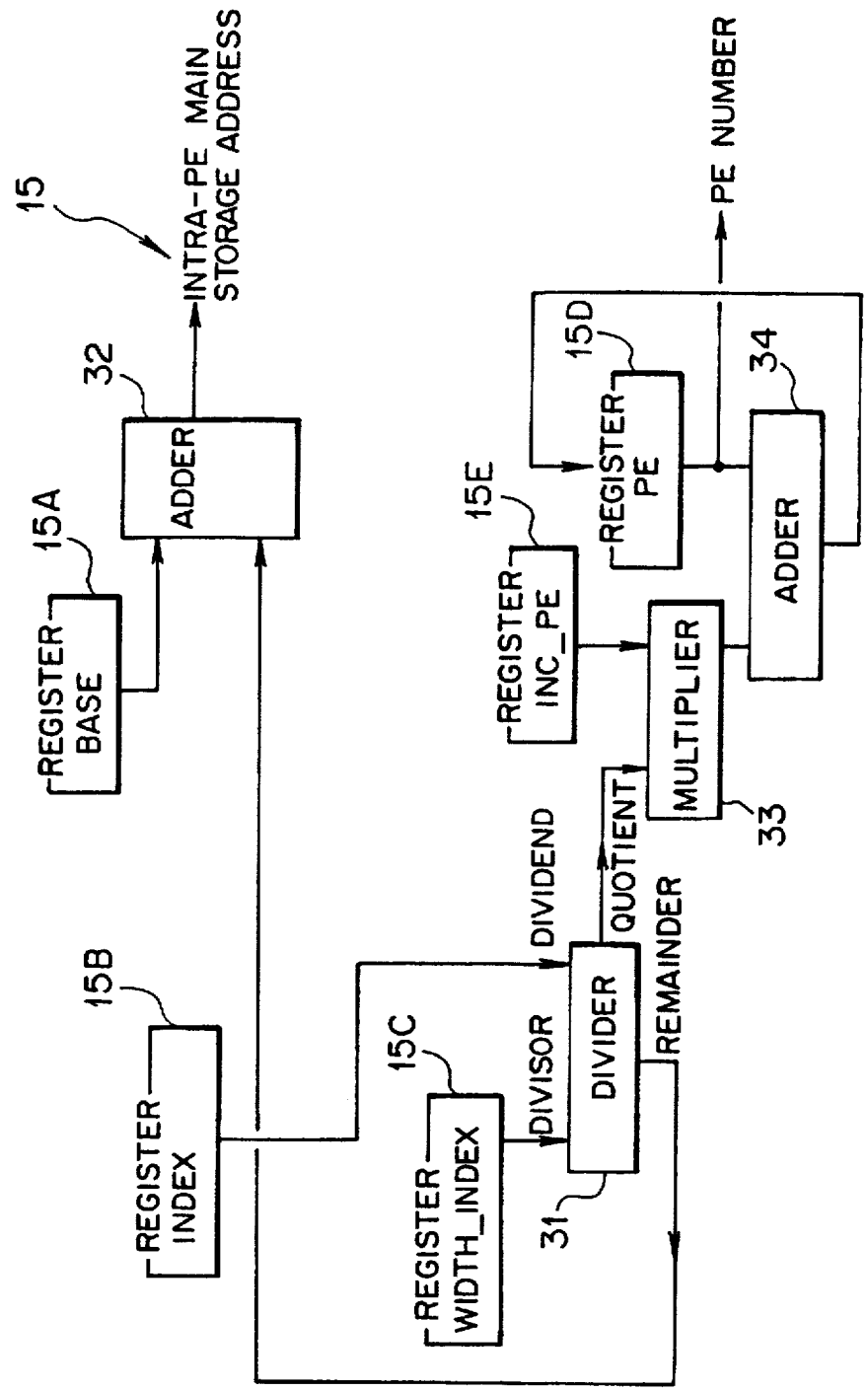
FIG. 4 is a block diagram showing a detailed structure of the array address converting apparatus according to the first embodiment.
Figure 6:
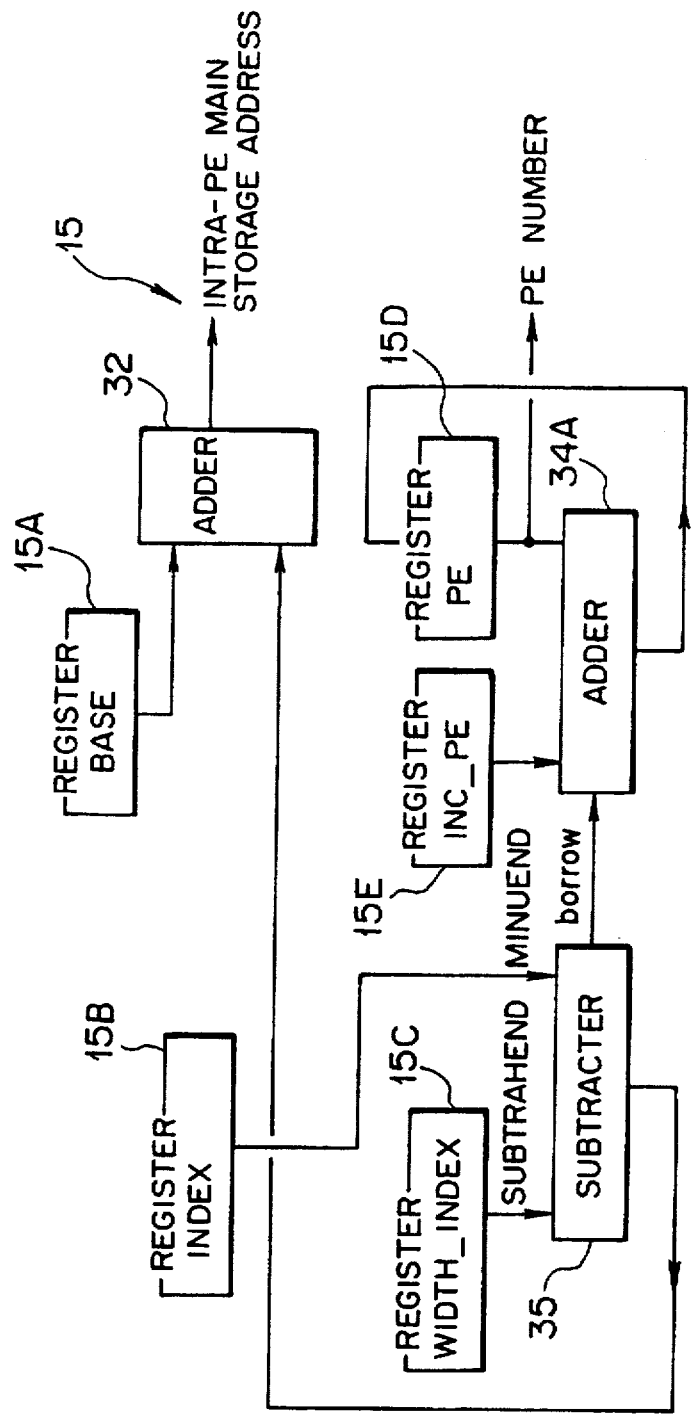
FIGS. 6 and 7 are block diagrams showing detailed structures of modifications of the array address converting apparatus according to the first embodiment.

FIG. 4 is a block diagram showing an example of a structure of the array address converting apparatus 15 used for a single instruction-single array element access, which includes a divider, a multiplier and the like. FIG. 6 is a block diagram showing an example of a structure of the array address converting apparatus 15 used for a single instruction-single array element access, which is configured with only adders and a subtracter. FIG. 7 is a block diagram showing an example of a structure of the array address converting apparatus 15 used for a single instruction-multiple array element access, which includes a divider, a multiplier and the like. FIG. 9 is a block diagram showing a structure of the array address converting apparatus 15 used for-a single instruction-multiple array element access, which is configured with only adders and subtracters.

(a3-1) Address Converting Apparatus for a Single Instruction-Single Array Element (including a multiplier and a divider)

The array address converting apparatus 15 for a single instruction-single array element access shown in FIG. 4 includes a multiplier and a divider. The array address converting apparatus 15 shown in FIG. 4 has at least, as the register group 15a, a register 15A for retaining a leading address (a partitioned piece address) "BASE" of array data, a register 15B for retaining an offset (an index offset) "INDEX" from the lead of the array data to an array element that is an object of an access, a register 15C for retaining an array data width (a width of a block unit;=[a region of array indexes]/[a number of partitions]) "WIDTH_INDEX", a register 15D for retaining a PE number "PE" of a PE 10 retaining the leading element of the array data, and a register 15E for retaining a value of an increment of the PE number "INC_PE".

In order to implement an operation on the basis of data (array data access information) retained in these registers 15A through 15E, the array address converting apparatus 15 has a divider 31, an adder 32, a multiplier 33 and an adder 34.

In the array address converting apparatus 15 shown in FIG. 4, the divider 31, the adder 32, the multiplier 33 and the adder 34 form a circuit for calculating a PE number and an intra-PE main storage address on the basis of the following equations:

$$[PE \text{ number}] = [\text{a } PE \text{ number retaining the leading} \quad (1)$$
$$\text{element of the array data}] + \{[\text{an offset}$$
$$\text{from the lead of the array data}]/[\text{an array}$$
$$\text{data width allocated to one } PE]\} \times [\text{a}$$
$$\text{value of an increment of the } PE \text{ number}]$$
$$= \text{``PE''} + (\text{``INDEX''/``WIDTH\_INDEX''})$$
$$\times \text{``INC PE''}$$

$$[\text{an intra-}PE \text{ main storage address}] \quad (2)$$
$$= [\text{an address of the leading of the array data}] +$$
$$[\text{an offset from the lead of the array data}] \%$$
$$[\text{an array data width allocated to one } PE]$$
$$= \text{``BASE''} + \text{``INDEX''} \% \text{``WIDTH\_INDEX''}$$

Namely, the divider 31 calculates a quotient "INDEX"/"WIDTH_INDEX" ("/" means integer division) and a remainder "INDEX"%"WIDTH_INDEX" ("%" means integer modulo operation) with "INDEX" retained in the register 15B as a dividend and "WIDTH_INDEX" retained in the register 15C as a divisor, and outputs them. The adder 32 adds "BASE" retained in the register 15A with the remainder "INDEX"%"WIDTH_INDEX" from the divider 31, and outputs an intra-PE main storage address expressed by the above equation (2).

The multiplier 33 multiplies "INC_PE" retained in the register 15E by a quotient "INDEX"/"WIDTH_INDEX" from the divider 31 and outputs a result. The adder 34 adds "PE" retained in the register 15D with a result of the multiplication ("INDEX"/"WIDTH_INDEX")×"INC_PE") from the multiplier 33, and outputs a PE number expressed by the above equation (1). Incidentally, the PE number calculated by the adder 34 is written in the register 15D and retained therein. If addresses are continuously generated, the PE number retained in the register 15D is used as "PE" when the next address is generated.

Figure 5:
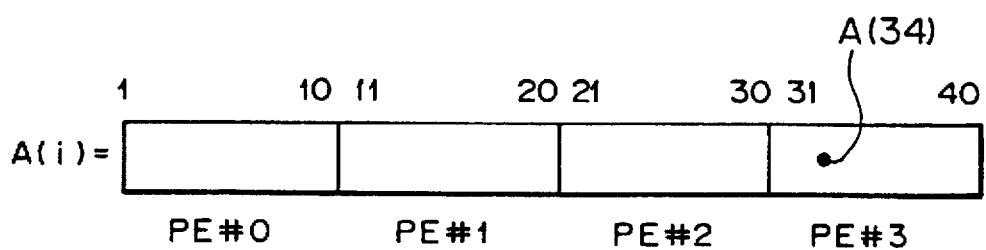
FIG. 5 is a diagram for illustrating an operation (array elements) in the case of a single instruction-single array element access according to the first embodiment.

With such circuit (the address generating circuit 15b), it is possible to calculate addresses of array data partitioned as shown in FIG. 5 as below. In an example shown below, a size of each array element configuring the array data is one byte (an address unit) for the sake of simplicity.

In an example shown in FIG. 5, the array data is composed of 40 array elements A(i) (i=1 through 40). The array data is partitioned into four blocks corresponding to four PEs 10. PE numbers of the PEs 10 are assumed to be 0 through 3, and a PE 10 having a PE number j is expressed as PE#j. Assuming here that an array element group A(1:10) are allocated to a PE#0, an array element group A(11:20) are allocated to a PE#1, an array element group A(21:30) are allocated to a PE#2, and an array element group A(31:40) are allocated to a PE#3. Assuming as well that a leading address of a main storage region in which the array element group (an array partitioned piece) in each PE 10 is in equal, and the address is expressed as "BASE".

If the array element A(34) is accessed, "BASE"=base, "PE"=0, "INDEX"=34−1=33, "WIDTH_INDEX"=10, "INC_PE"=1 are set access information to the register group 15a (the registers 15A through 15E). With the above information, the array address converting apparatus 15 shown in FIG. 4 calculates:

[PE number]=0+33/10×1=3, and [Intra-PE main storage address]= base+33%10=base+3 as a PE number and an intra-PE main storage address of the array element A(34). These values indicate an address of the array element A(34), and shows as well that the array element A(34) exists at a main storage address "base+3" in the main storage apparatus 12 of a PE 10 (the PE#3) having the PE number 3.

(a3-2) Array Address Converting Apparatus for a Single Instruction-Single Array Element (comprising only two adders and a subtracter)

The array address converting apparatus 15 used for a single instruction-single array element access shown in FIG. 6 has a function quite similar to that of the array address converting apparatus 15 shown in FIG. 4 realized with only two adders and a subtracter without a multiplier or a divider. As the register group 15a, there are provided registers 15A through 15E quite similar to those described hereinbefore with reference to FIG. 4. Adders 32 and 34A, and a subtracter 35 are provided in order to implement an operation on the basis of data (the array data partition information and the array data access information) retained in these registers 15A through 15E.

In the array address converting apparatus 15 shown in FIG. 6, the adders 32 and 34A and the subtracter 35 form a circuit for calculating a PE number and an intra-PE main storage address on the basis of the above equations (1) and (2), as well.

The array address converting apparatus 15 shown in FIG. 6 has the subtracter 35 instead of the divider 31 shown in FIG. 4, and the adder 34A instead of the multiplier 33 and the adder 34 shown in FIG. 4.

The subtracter 35 is inputted thereto "INDEX" retained in the register 15B as a minuend and "WIDTH_INDEX" retained in the register 15C as a subtrahend, and repeatedly subtracts "INDEX" from "WIDTH_INDEX". A "borrow" signal is outputted to the adder 34A each time a subtracting process is performed. An operation of the subtracter 35 can be described as follows:

tmp = minuend while (tmp ≧ subtrahend) { tmp = tmp − subtrahend;

send to borrow to adder 34A;

} output = tmp;

Namely, the subtracter 35 repeatedly performs a subtracting process such as a minuend (tmp)=a subtrahend−minuend every clock cycle so long as a minuend≧subtrahend is established, and outputs a "borrow" signal to the adder 34A each time the subtrahend can be subtracted from the minuend. The subtracter 35 stops the subtracting process at a point of time when the subtrahend cannot be subtracted from the minuend since the subtrahend>the minuend. Whereby, the "borrow" signal is outputted to the adder 34A the number of times corresponding to a quotient (that is, the number of repetition of the subtracting process). The minuend "tmp" at a point of time when the subtrahend cannot be subtracted from the minuend is outputted as a remainder from the subtracter 35 to the adder 32.

The adder 34A adds "PE" (the right input of the the adder 34A) retained in the register 15D with "INC_PE" (the left input of the adder 34A) retained in the register 15E each time the "borrow" signal is inputted from the subtracter 35. A result of the addition obtained by the adder 34A is written and retained in the register 15D, and used as a value of "PE" for the next adding process by the adder 34A. An operation of the adder 34A can be described as follows:

if (borrow from subtracter 35)

output = right input + left input;

else output = right input;

Namely, the adder 34A spuriously performs a multiplexing process by performing an adding process such as "PE"= "PE"+"INC_PE" every "borrow" signal from the subtracter 35.

In the array address converting apparatus 15 shown in FIG. 6, a PE number and an intra-PE main storage address generated in the last repetitive clock cycle are only effective information. Therefore, only the information obtained in the last repetitive clock cycle is outputted as a PE number and an intra-PE main storage address of the array element that is an object of an access.

As above, the array address converting apparatus 15 shown in FIG. 6 operates quite similarly to that shown in FIG. 4 excepting a time required for address generation.

(a3-3) Array Address Converting Apparatus for a Single Instruction-Multiple Array Element (including a multiplier and a divider)

Figure 7:
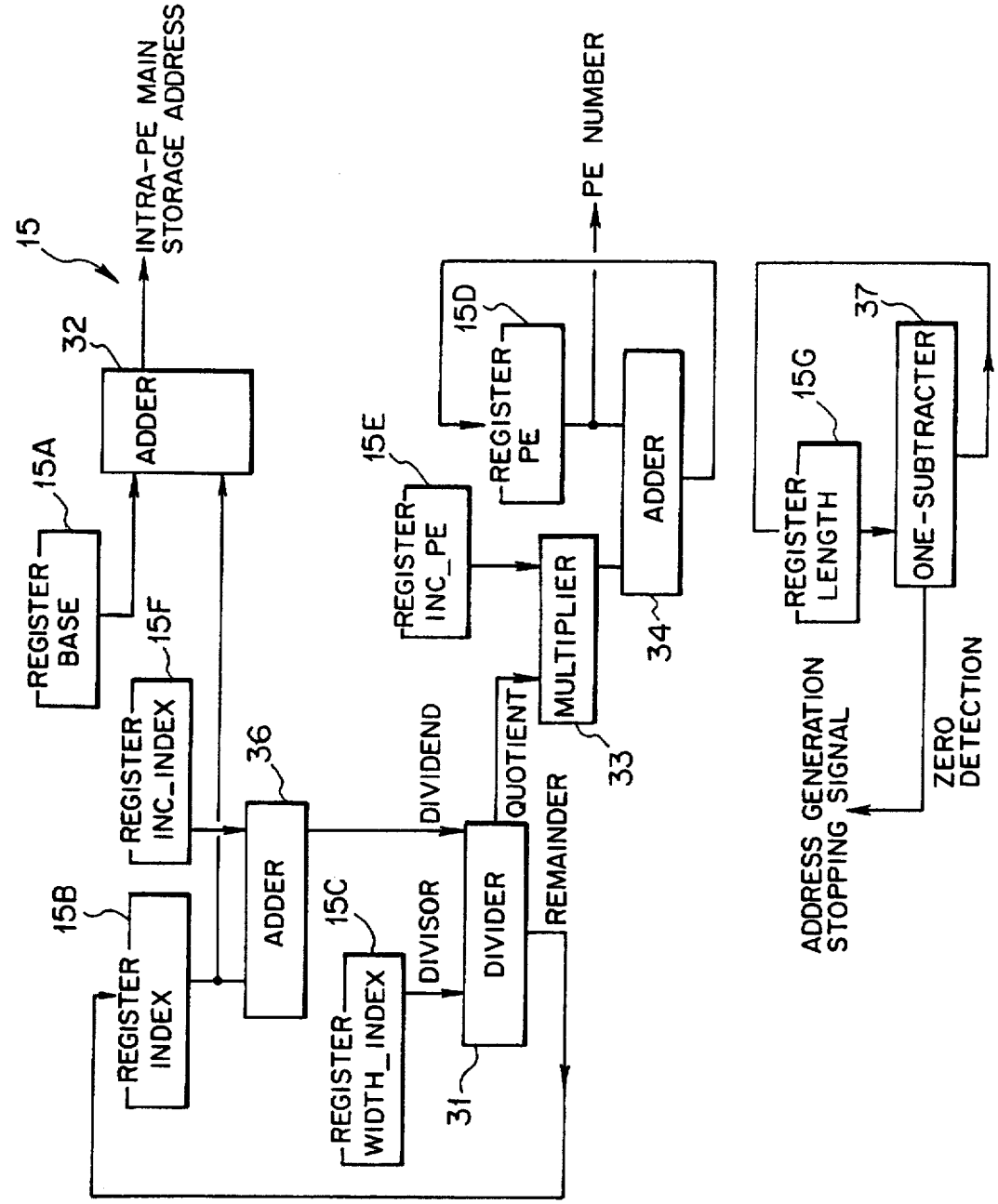

The array address converting apparatus 15 used for a single instruction-multiple array element access shown in FIG. 7 includes a multiplier and a divider. The array address converting apparatus 15 shown in FIG. 7 has at least, as the register group 15a, a register 15A for retaining an access base address (a leading address of array data, a partitioned piece address) "BASE", a register 15B for retaining an access start offset (an index offset from the lead of array data to a leading array element of a stride element group that is an object of an access) "INDEX", a register 15C for retaining a width of indexes retained by one PE 10 (a width of a block unit:=[a region of array indexes]/[a partitioned number]) "WIDTH_INDEX", a register 15D for retaining an access start PE number "PE", and a register 15E for retaining a PE number incrementing value "INC_PE", similar to the above-mentioned registers 15A through 15E. The array address converting apparatus 15 additionally has a register 15F for retaining a stride of an access (a stride of a stride element group that is an object of an access) "INC_INDEX", and a register 15G for retaining the number of data to be accessed (the number of elements of the stride element group that is an object of the access )"LENGTH".

The array address converting apparatus 15 also has a divider 31, an adder 32, a multiplier 33 and an adder 34 similar to those shown in FIG. 4 so as to perform an operation on the basis of data (the array data partition information and the array data access information) retained in these registers 15A through 15G. In addition, an adder 36 and a one-subtracter 37 are newly added to the array address converting apparatus 15.

In the array address converting apparatus 15 shown in FIG. 7, the divider 31, the adder 32, the multiplier 33, the adder 34, the adder 36 and the one-subtracter 37 form a circuit for continuously calculating PE numbers and intra-PE main storage addresses of an array element group that is an object of an access on the basis of the following equations (3) (4). In the following equations (3) and (4), a value of i in the equations is successively changed in each cycle such as 0, 1, 2, 3, 4, . . . , (LENGTH−1).

$$[PE \text{ number}] = [\text{access start } PE \text{ number}] + \{([\text{access start offset}] + [\text{stride of access}] \times i)/[\text{array data width allocated to one } PE]\} \times [PE \text{ number increment value}] \quad (3)$$

$$= "PE" + (["INDEX" + "INC\_INDEX" \times i]/ "WIDTH\_INDEX") \times "INC\_PE"$$

$$[\text{intra-}PE \text{ main storage address}] \quad (4)$$
$$= [\text{access base address}] + ([\text{access start offset}] + [\text{stride of access}] \times i) \% [\text{array data width allocated to one } PE]$$
$$= "BASE" + ["INDEX" + "INC\_INDEX" \times i] \% "WIDTH\_INDEX"$$

Namely, the adder 36 adds "INDEX" retained in the register 15B with "INC_INDEX" retained in the register 15F. An adding process by the adder 36 is not performed in the first clock cycle after a start of the process, but a value of "INDEX" is outputted as it is from the adder 36. In the second clock cycle and afterward, a result of an addition of "INDEX" with "INC_INDEX" is outputted from the adder 36. An output from the adder 36 is inputted to the divider 31 as a dividend.

The divider 31 calculates a quotient and a remainder with the result of the addition "INDEX"+"INC_INDEX" from the adder 36 as a dividend and "WIDTH_INDEX" retained in the register 15C as a divisor. A remainder from the divider 31 is written as "INDEX" into the register 15B every clock cycle. "INDEX" of the register 15B is updated, and a value obtained by adding "INC_INDEX" to the updated value by the adder 36 is given as a dividend to the divider 31, whereby the divider 31 calculates a quotient ("INDEX"+"INC_INDEX"×i)/"WIDTH_INDEX" and a remainder ("INDEX"+"INC_INDEX"×i)%"WIDTH_INDEX" and outputs them. Provided that a value of i is successively incremented by one from 0 every clock cycle.

The adder 32 adds "BASE" retained in the register 15A to the remainder ("INDEX +"INC_INDEX"+i)%"WIDTH_INDEX" from the divider 31, and successively outputs intra-PE main storage addresses expressed by the above equation (4).

The multiplier 33 multiples "INC_PE" retained in the register 15E by a quotient ("INDEX"+"INC_INDEX"+i)/ "WIDTH_INDEX" from the divider 31, and outputs a result of the multiplication. The adder 34 adds "PE" retained in the register 15D to a result of the mutiplication ("INDEX"+"INC_INDEX"+i)/"WIDTH_INDEX"]+ "INC_PE" from the multiplier 33, and outputs a PE number expressed by the above equation (3). A PE number calculated by the adder 34 is written in the register 15D every clock cycle so as to be updated. The updated value is added to a result of multiplication from the multiplier 33 by the adder 34 in the next clock cycle.

The one-subtracter 37 subtracts 1 from "LENGTH" retained in the register 15G every clock cycle, and writes and updates a result of the subtraction as a new "LENGTH". If a result obtained by subtracting 1 becomes 0, the one-subtracter 37 outputs a signal to stop the above-mentioned address generating process by the divider 31, the adders 32, 34 and 36 and the multiplier 33. At a point of time when a result of the subtraction by the one-subtracter 37 becomes 0, that is, at a point of time when the address generating process is performed the number of times corresponding to the number of data to be accessed (i=0 through LENGTH−1), the address generating process is stopped in the array address converting apparatus 15 shown in FIG. 7.

Figure 8:
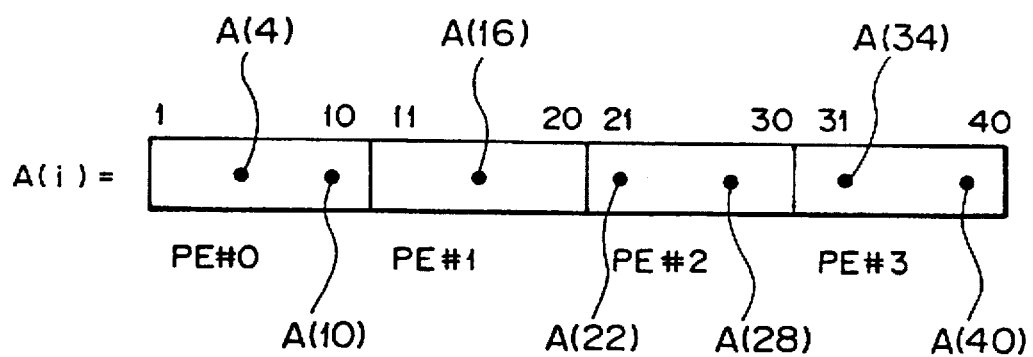
FIG. 8 is a diagram for illustrating an operation (array elements) in the case of a single instruction-multiple array element access according to the first embodiment.

With such circuit (the address generating circuit 15b), it is possible to implement an address calculation for array data partitioned as shown in FIG. 8, for example. Incidentally, assuming here that a size of each array element configuring array data is one byte (an address unit) for the sake of simplicity.

In an example shown in FIG. 8, it is assumed that array data consists of forty array elements A (i) (i=1 through 40), and the array data is partitioned into blocks of four PEs 10, similarly to the example shown in FIG. 5. PE numbers of the PEs 10 are assigned 0 through 3, and a PE 10 having a PE number j is expressed as a PE#j. It is also assumed that a array element group A(1:10) is allocated to a PE#0, an array element group A(11:20) is allocated to a PE#1, an array element group 1(21:30) is allocated to a PE#2, and an array element group A(31:40) is allocated to a PE#3. A leading address in a main storage region of each PE 10 in which an array element group (an array partitioned piece) is stored is in equal, and the address is expressed as "BASE".

At this time, an access pattern is expressed in, for example, the following program:

Access pattern:

DO 1000 *I* = 4, 40, 6

A(*I*) = . . .

1000 CONTINUE

The above access pattern is to get an access to array elements A(I) which I=4 to 40 out of the array data A (1:40) at a stride of 6. In this case, as the array data access information, the following values are set in the register group 15a (registers 15A through 15G):

"BASE"=base
"PE"=(4−1)/10=0
"INC_PE"=1
"INDEX"=(4−1)%10=3
"INC_INDEX"=6
"WIDTH_INDEX"=10
"LENGTH"=(40−4+6)/6=7

By setting the above values in the register group 15a (the registers 15A through 15E), the array address converting apparatus 15 shown in FIG. 7 continuously generates an address sequence as shown in the following TABLE 1, whereby PE numbers and intra-PE main storage addresses of the array element group {A(4), A(10), A(16), A(22), A(28), A(34) and A(40)} as shown in FIG. 8 are successively specified.

TABLE 1

| order of generating | PE number | intra-PE address | array element |
|---|---|---|---|
| 0 | 0 | base + 3 | = A(4) |
| 1 | 0 | base + 9 | = A(10) |
| 2 | 1 | base + 5 | = A(16) |
| 3 | 2 | base + 1 | = A(22) |
| 4 | 2 | base + 7 | = A(28) |
| 5 | 3 | base + 3 | = A(34) |
| 6 | 3 | base + 9 | = A(40) |

(a3-4) Array Address Converting Apparatus for a Single Instruction-Single Array Element (comprising only adders and subtracters)

Figure 9:
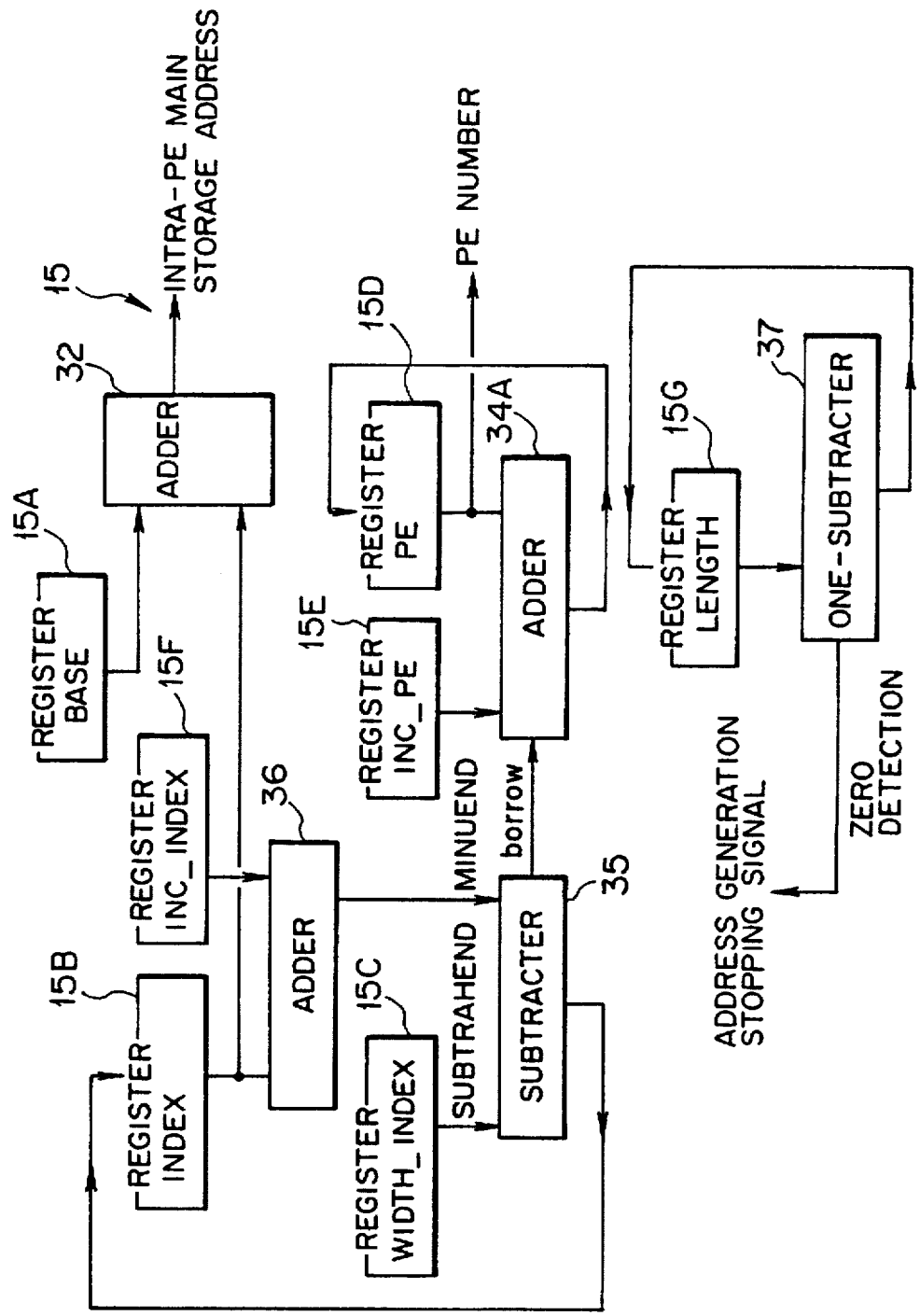
FIG. 9 is a block diagram showing a detailed structure of a modification of the array address converting apparatus according to the first embodiment.

An array address converting apparatus 15 used for a single instruction-single array element access shown in FIG. 9 has a function quite similar to that of the array address converting apparatus 15 shown in FIG. 7 realized with only adders and subtracters without a multiplier or a divider. There are provided registers 15A through 15G quite similar to those described herinbefore with reference to FIG. 7 as the register group 15a, along with adders 32, 34A and 36, a subtracter 35 and a one-subtracter 37 in order to implement an operation on the basis of data (the array data partition information and the array data access information) retained in the registers 15A through 15G.

In the array address converting apparatus 15 shown in FIG. 9, the adders 32, 34A and 36, the subtracter 35 and the one-subtracter 37 form a circuit for continuously calculating PE numbers and intra-PE main storage addresses on the basis of the above equations (3) and (4). The adders 32, 34A and 36, the subtracter 35 and the one-subtracter 37 function similarly to those described hereinbefore with reference to FIG. 6 or FIG. 7, which spuriously perform multiplication, division and a residual operation by repeating addition-subtraction as described hereinbefore with reference to FIG. 6. The array address converting apparatus 15 shown in FIG. 7 operates quite similarly to that shown in FIG. 7 excepting a time required for address generation. (a4) Way of Use of the Array Address Converting Apparatus Next description will be made of a practical application of the above-mentioned array address converting apparatus 15 in the parallel computer of a distributed storage type according to the first embodiment. Incidentally, a partitioning/locating technique for array data or a logical configuration of a processor array are disclosed in detail in the above-mentioned "High Performance Fortran Language Specification", a detailed description of which will be thus omitted here.

[Applicable Array Data]

Array data accessible using the array address converting apparatus 15 according to this embodiment is limited to what satisfying the following conditions (1) and (2):

(1) Each axis of array data may be partitioned in PEs 10, or not partitioned. If partitioned, the axis of array data is partitioned into blocks.

(2) A leading address of a region in which a partitioned piece (a block) of array data is located is the same in all PEs 10. If the number of elements on the axis to be partitioned is not partitioned by the number of PEs 10 in which the array data is partitioned and located, array elements in number of [(the number of elements on the axis+the number of PEs on the axis−1)/the number of PEs on the axis] are allocated to the PEs 10 excepting a PE 10 having the largest PE number, and remaining array elements are allocated to the PE 10 having the largest PE number. At this time, a storage region is ensured assuming that the PE 10 having the largest PE number is allocated thereto array elements in the same number as another PEs 10. In other words, it is necessary to equalize allocation of the array elements on the main storage apparatus 12 in all PEs 10. [Logical Configuration of a Processor Array (Processor shape)]

Here, any number of dimensions of a logical shape of the processor 13 is allowed.

(a4-1) Single Instruction-Single Array Element Access

A manner of getting a single instruction-single array element access is as simple as an ordinary access instruction, a detailed description of which will be omitted.

(a4-2) Single Instruction-Multiple Array Element Access

[Declaration]

To simplify the description, assuming that array data is in three-dimension, and a processor array is also in three-dimension. Three-dimensional array and three-dimensional processor array are described in "HIGH PERFORMANCE FORTRAN" as follows:

```
!HPF$ PROCESSOR PE(p(1),p(2),p(3))
      REAL A(is(1):ie(1), is(2):ie(2),
is(3):ie(3))
      !HPF$ DISTRIBUTE A(BLOCK,BLOCK,BLOCK) ONTO PE
```

This is a declaration of three-dimensional array data. If is(3)=ie(3)=1, the above is equal to a declaration of two-dimensional array data. Further, if is(2)=ie(2)=1, the above is equal to a declaration of two-dimensional array data.

[Array Partition Information]

To simplify calculations of values to be set in the register group 15a in the array address converting apparatus 15, a software generates array partition information API. The array partition information API is information composed of array declaration information and partition declaration information, a form of which is as shown below in TABLE 2.

The array partition information is allocated to every declared array data one by one. If two array data are "aliased" using an "EQUIVALENCE" statement of FORTRAN, the array partition information is allocated by array name by array name.

TABLE 2

| name of member of array partition information | description |
|---|---|
| API·BASE | a leading address of a partitioned array piece (the same in each PE) |
| API·INC_PE[i] i=1–API·DIM | a quantity of a change in PE number if a sweep strides over a PE (in each dimension) $$= \prod_{j=1}^{i-1} p[j]$$ |
| API·WIDTH_INDEX[i] i=1–API·DIM | a width of each dimension of an array partitioned piece $$= \frac{(ie[i] - is[i] + pe[i])}{pe[i]}$$ |
| API·INC_INDEX[i] i=1–API·DIM+1 | an increment of an address (in each dimension) if an index of an array partitioned piece is incremented by one $$= \prod_{j=1}^{i-1} API \cdot INC\ WIDTH[j]$$ |
| API·INDEX[i] i=1–API·DIM | a start index of each dimension = is[i] |
| API·DIM | the number of dimensions of array data |

If an array declaration and a declaration of a processor array are carried out statistically, the array partition information becomes statistic through a program unit so as to be determined upon compilation. If an array declaration and a processor array cannot be determined statistically, it is possible to successively use array partition information generated by a parent routine.

[An Example of Array Partition Information]

```
program:
  !HPF$ PROCESSOR P(100)
  REAL A(1000,1000)
  !HPF$ DISTRIBUTE A(BLOCK, *) ONTO P
array partition information:
  API·INC_PE(1:2) = {1,0}
  API·INC_index(1:3) = {1,10,10000}
  API·INDEX(1:2) = {1,1}
  API·WIDTH_INDEX(1:2) = {1,1000}
  API·DIM = {3}
```

Values to be set in the register group 15a in the array address converting apparatus 15 are calculated in the following procedure. As a language expressing the procedure, C language is used, for example. In a description of the program below, notes in the brackets are for describing contents of a program description on the line.

```
void
set gad(
  int array_id, [an ID of array data. Used for API retrieval]
  int access_INDEX(1:3) [a value of an index from which an access is started. A value of each
``` dimension]
```
  int sweep_dim, [a dimension which is swept]
  int stride, [a stride]
  int length [the number of data]
)
{
  int   d;
  int   a;
  int   tmp;
  a = array_id;
  d = sweep_dim;
  tmp1 = API(a)·BASE;
  tmp2 = 0;
  for (i! = 1; i<API(a)·DIM; i++){
    if(i > sweep_dim){
      tmp1 +=(access_INDEX(i)–API(a)·INDEX(i))%
        API(a)· WIDTH_INDEX(i)*API(a)·
INC_INDEX(1);
    }
      tmp2 +=(access_INDEX(i)–
API(a)·Index(i)/API(a)·WIDTH_INDEX(i)*API(a)·INC_PE(i);
  {
    register 15A in the array address converting
apparatus "BASE" =tmp1;
    register 15D within the array address converting
apparatus "PE" =tmp2;
    register 15E in the array address converting
apparatus "INC_PE" =API(a)·INC_PE(d);
    register 15B in the array address converting
apparatus "INDEX" =(access_INDEX(d)–
INDEX(d))%WIDTH_INDEX(d)*INC_INDEX(d);
    register 15F in the array address converting
apparatus "INC_INDEX"=API(a)·INC_INDEX(d)*stride;
    register 15C in the array address converting
apparatus "WIDTH_INDEX"=API(a)·INC_INDEX(d+1);
    register 15G in the array address converting
apparatus "LENGTH" =length;
}
```

The above is an example of one-dimensional array data (refer to FIGS. 5 and 8). Next description will be of an example of two-dimensional array data.

```
program:
  !HPF$ PROCESSOR P(2.2)
  REAL A(100,50)
  !HPF$ DISTRIBUTE A(BLOCK,BLOCK) ONTO P
  DO 100 I =4,100,29
    A(I,39)=. . .
  100 CONTINUE
```

Figure 10:
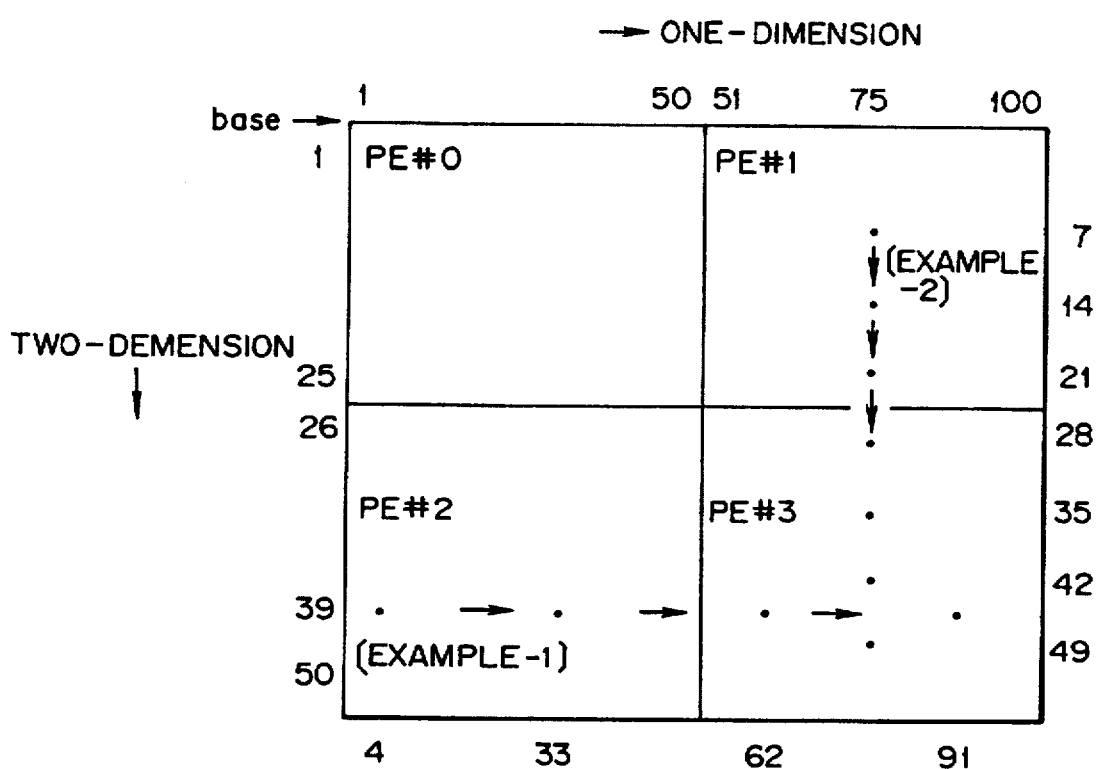
FIG. 10 is a diagram for illustrating an operation (array elements) if the first embodiment is applied to a two-dimensional array.

An array image at this time is as shown in FIG. 10, for example. Namely, array data in a one-dimensional direction is composed of one hundred array elements, and array data in a two-dimensional direction is composed of fifty array elements. The array data in two-dimension is partitioned and located in four PEs 10 (the PE numbers 0 through 3). Therefore, "INC_PE" in a one-dimensional direction is 1, and "INC_PE" in a two-dimensional direction is 2, as stated below.

array partition information:

| API·BASE | =base (common in all PEs 10) |
|---|---|
| API·INC_PE(1:2) | = {1,2} |
| API·INC_INDEX(1:3) | = {1,50,1250} |
| API·INDEX(1:2) | = {1,1} |
| API·WIDTH_INDEX(1:2) | = {50,25,,,,} |
| API·DIM | = {2} | global access specifier (values set in the registers 15A through 15G):

register 15A in the array address converting apparatus "BASE"=base+(39−1)%25 *50=base+650;

register 15D in the array address converting apparatus "PE"=(4−1)/50*1+(39−1)/25*2=2;

register 15E in the array address converting apparatus "INC PE"=1;

register 15B in the array address converting apparatus "INDEX"=(4−1)%50*1=3;

register 15F in the array address converting apparatus "INC_INDEX"=1*29=29;

register 15C in the array address converting apparatus "WIDTH_INDEX"=50;

register 15G in the array address converting apparatus "LENGTH"=(100−4+29)/29=4;

The values as above are set in the register group 15a (the registers 15A through 15G), whereby the array address converting apparatus 15 continuously generates an address sequence as shown in the following TABLE 3 so that PE numbers and intra-PE main storage addresses of an array element group A(4,39), A(33,39), A(62,39) and A(91,39) in a one-dimensional direction as shown in FIG. 10 as "example 1" are successively specified.

TABLE 3

| order of generation | PE number | intra-PE address | array element |
|---|---|---|---|
| 0 | 2 | base+480+13 | = A( 4,39) |
| 1 | 2 | base+480+42 | = A(33,39) |
| 2 | 3 | base+480+11 | = A(62,39) |
| 3 | 3 | base+480+40 | = A(91,39) |

Similarily, if the program is described as

```
!HPF$ DISTRIBUTE A(BLOCK,BLOCK) ONTO P
      DO 200 J=7, 50, 7
         A(75,J)=. . .
  200 CONTINUE
``` and the array partition information or a global accesser is set similarly to the above case, the array address converting apparatus 15 successively specifies PE numbers and intra-PE main storage addresses of a two-dimensional array element group A(75,7), A(75,14), A(75,21), A(75,28), A(75, 35), A(75,42) and A(75,49) as shown in FIG. 10 as "example 2".

According to the first embodiment of this invention, the array address converting apparatus 15 is provided separately from the processor 13 as a hardware for implementing an address calculation upon an access to array data so as to implement an address calculation at the time of an access to the array data independently from a process by the processor 13. This may omit an overhead time of the processor 13 required for an address calculation so as to largely improve an efficiency of the process by a parallel computer.

Particularly, in the case of a block partitioning of array data, it is possible to get an access to a single array element with a single instruction or get an access to multiple array elements with a single instruction from a processing apparatus. Further, the address generating circuit (an arithmetic circuit) 15b of the array address converting apparatus 15 may be formed quite simply with only adders and subtracters.

The register group 15a of the array address converting apparatus 15 is also served as a register (the registers 15B and 15D, for example) for temporarily retaining generation progress data of a PE number and an intra-PE main storage address, whereby a process for generating the PE number and the intra-PE main storage address may be continuously performed and an address converting process may be efficiently performed without necessity of initial setting of the array data access information each time.

(c) Description of Second Embodiment

Figure 11:
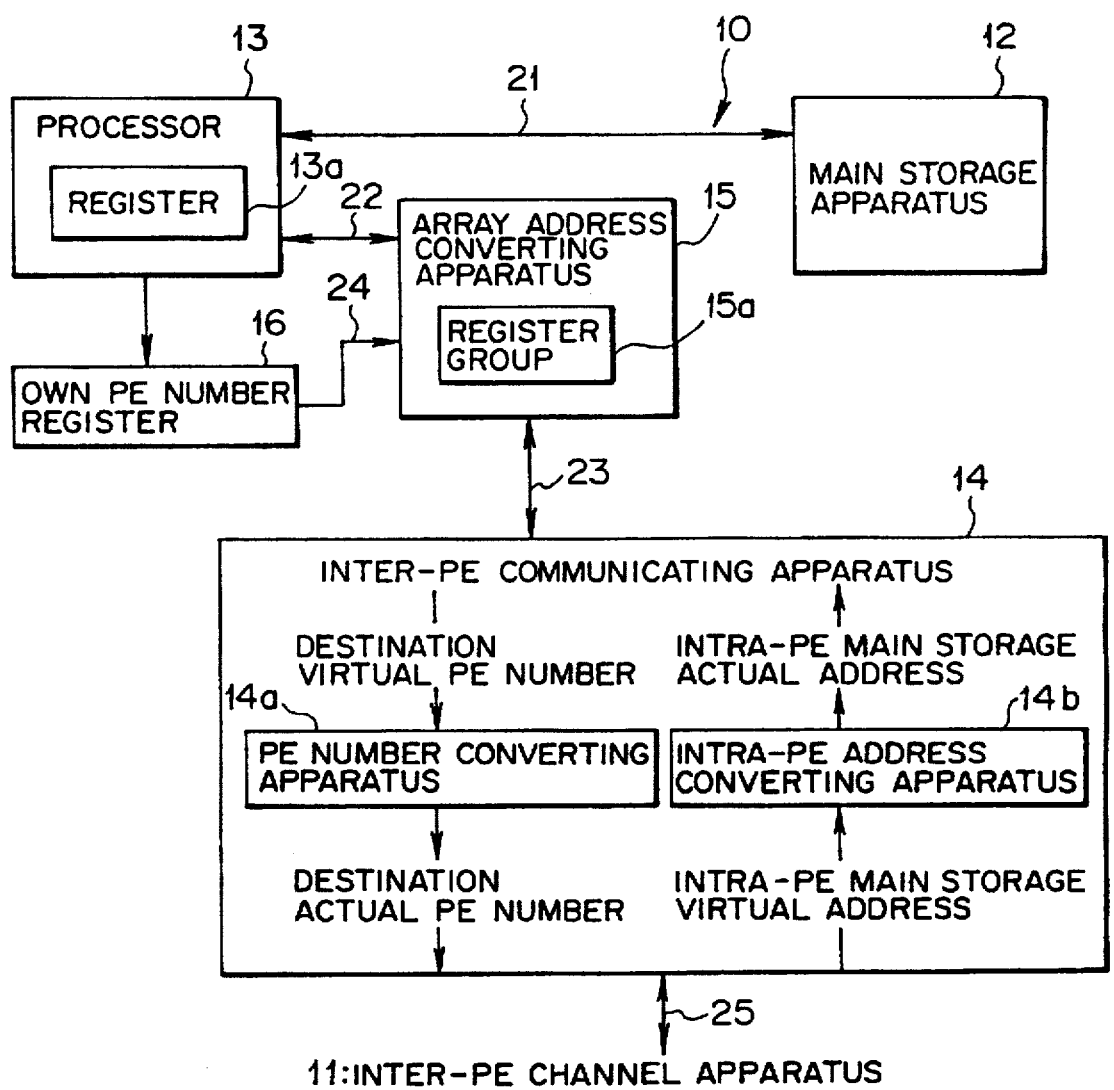
FIG. 11 is a block diagram showing a structure of a processor element in a parallel computer of a distributed storage type according to a second embodiment of the present invention.

FIG. 11 is a block diagram showing a structure of a processor element in a parallel computer of a distributed storage type according to a second embodiment of this invention. As shown in FIG. 11, a PE 10 in the parallel computer of a distributed storage type according to the second embodiment is configured similarly to that according to the first embodiment shown in FIG. 2.

As to a parallel computer retaining PE numbers and intra-PE main storage addresses in a virtual mode, it is necessary to convert an address of an output of the array address converting apparatus 15. To comply with the virtual address mode, an inter-PE communicating apparatus 14 has a PE number converting apparatus 14a and an intra-PE address converting apparatus 14b in the PE 10 according to the second embodiment.

Figures 19, 20:
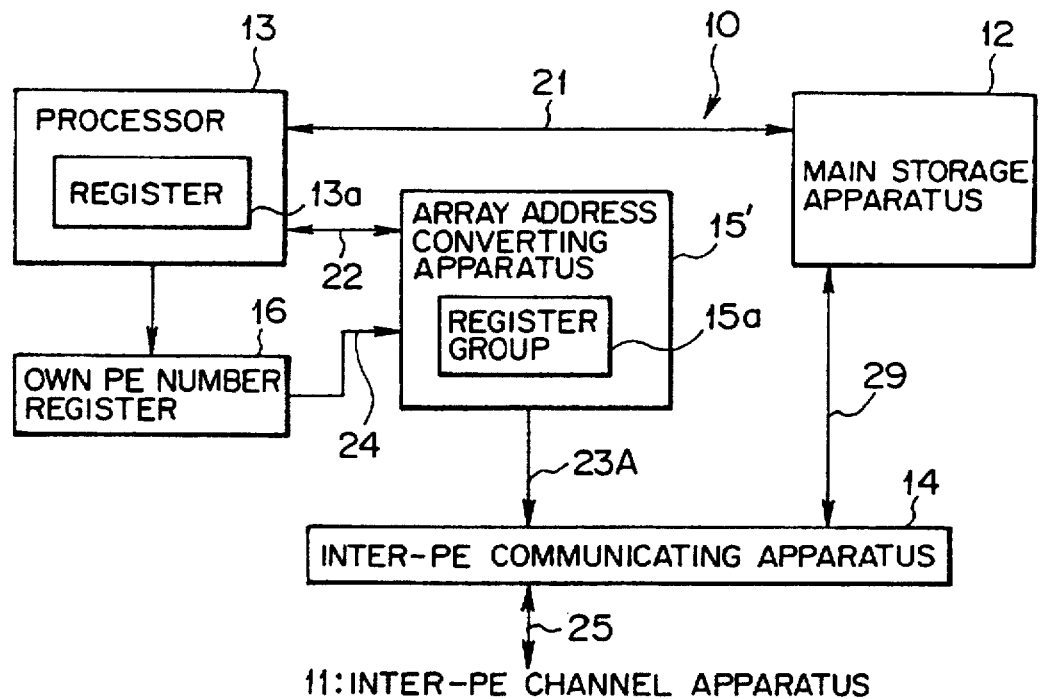
FIG. 19 is a block diagram showing a structure of a processor element in a parallel computer of a distributed storage type according to a seventh embodiment of the present invention.
FIG. 20 is a diagram showing an example of a hardware table (a table for converting a virtual PE number into an actual PE number) provided to a PE number converting apparatus according to the present invention.
Figure 21:
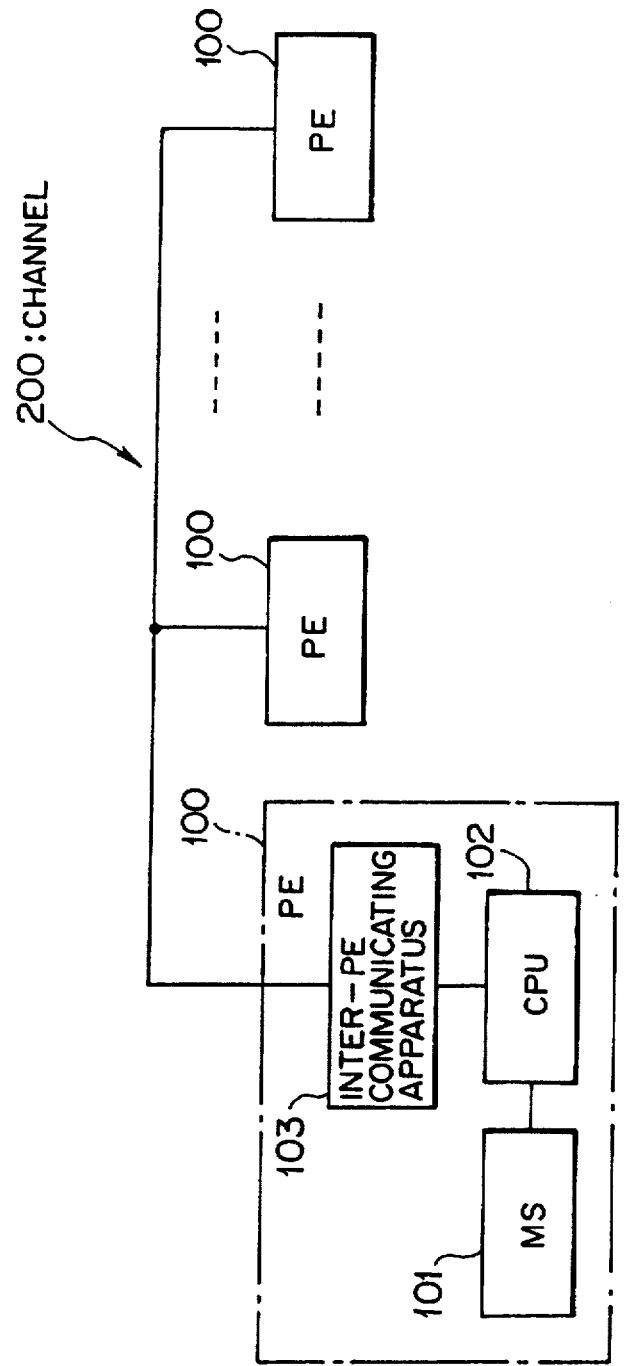
FIG. 21 is a block diagram showing a structure of a general parallel computer.
Figure 23:
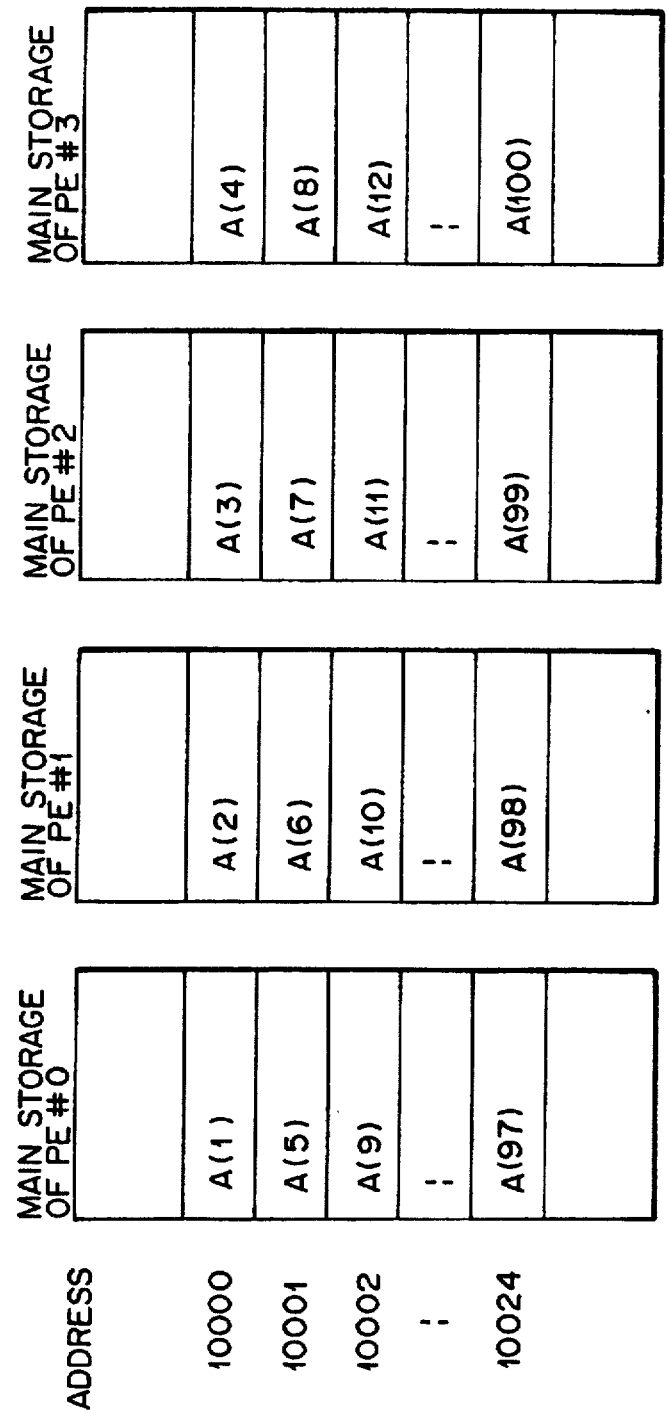
FIG. 23 is a diagram for illustrating an example of a general cyclic partitioning.

The PE number converting apparatus 14a has a hardware table as shown in FIG. 20, for example, for storing a correspondence between a virtual PE number and an actual PE number, which regards a PE number generated by the array address converting apparatus 15 as a virtual PE number to convert the virtual PE number into an actual PE number by retrieving the hardware table. Namely, an address of the destination virtual PE number is converted by the PE number converting apparatus 14a in an access demand source PE 10. Incidentally, in FIG. 20, M represents a maximum value of the virtual PE number.

The intra-PE address converting apparatus 14b regards an intra-PE main storage address received from another PE 10 as an intra-PE main storage address, and converts the intra-PE main storage virtual address into an intra-PE main storage actual address in own PE 10. Namely, the intra-PE main storage virtual address is converted into the main storage actual address by the intra-PE address converting apparatus 14b in the destination PE 10.

(d) Description of a Third Embodiment

Figure 12:
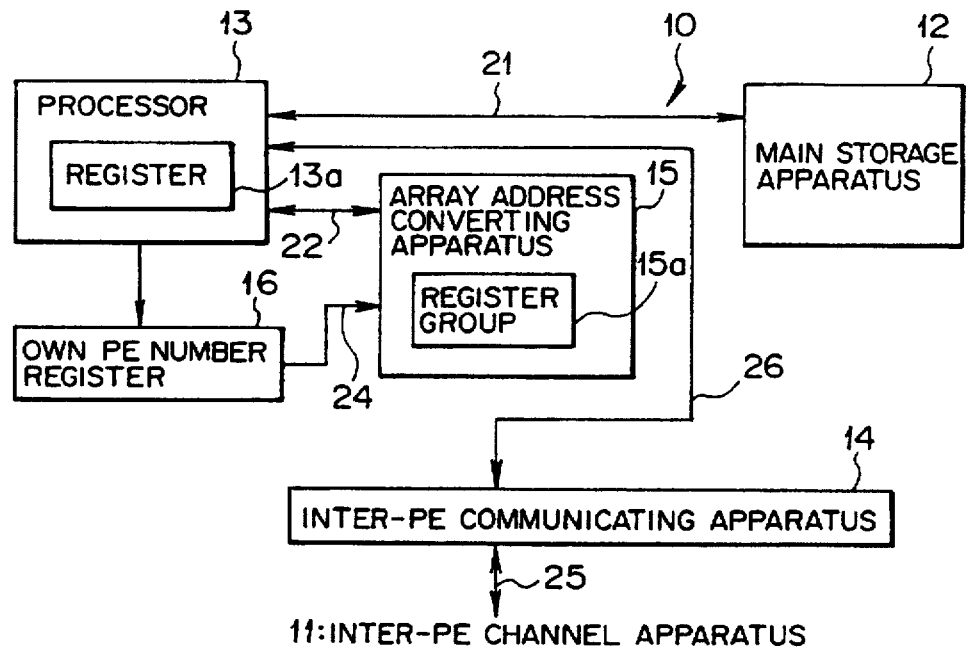
FIG. 12 is a block diagram showing a structure of a processor element in a parallel computer of a distributed storage type according to a third embodiment of the present invention.

FIG. 12 is a block diagram showing a structure of a processor element of a parallel computer of a distributed storage type according to a third embodiment of this invention. As shown in FIG. 12, a PE 10 in the parallel computer of a distributed storage type according to the third embodiment is configured similarly to that according to the first embodiment shown in FIG. 2. In the PE 10 in the parallel computer of a distributed storage type according to the third embodiment, the control/data line 23 connecting the array address converting apparatus 15 and the inter-PE communicating apparatus 14 is omitted. Instead of the control/data line 23, the processor 13 and the inter-PE communicating apparatus 14 is connected over a control/data line 26.

In the PE 10 according to the third embodiment, the processor 13 reads out a PE number and an intra-PE main storage address generated by the array address converting apparatus 15 from the array address converting apparatus 15, activates the communicating apparatus 14 over the control/data line 26 on the basis of the PE number and the PE internal main storage address read out to control transmission of access demand information by the communication apparatus 14.

According to the third embodiment, the processor 13 directly controls the communicating apparatus 14 over the control/data line 26 in the PE 10 so that the PE number and the intra-PE main storage address are notified to the communicating apparatus 14 over the control/data line 26.

In addition, store data to anther PE 10 or load data from another PE are exchanged between the processor 13 and the communicating apparatus 14 over the control/data line 26.

Further, the control/data line 22 connecting the processor 13 and the array address converting apparatus 15 is used when array data access information is written from the register 13a of the processor 13 into the register group 15a of the array address converting apparatus 15, and when a PE number and an intra-PE main storage address generated by the array address converting apparatus 15 are read out from the array address converting apparatus 15 into the processor 13.

(e) Description of a Fourth Embodiment

Figure 13:
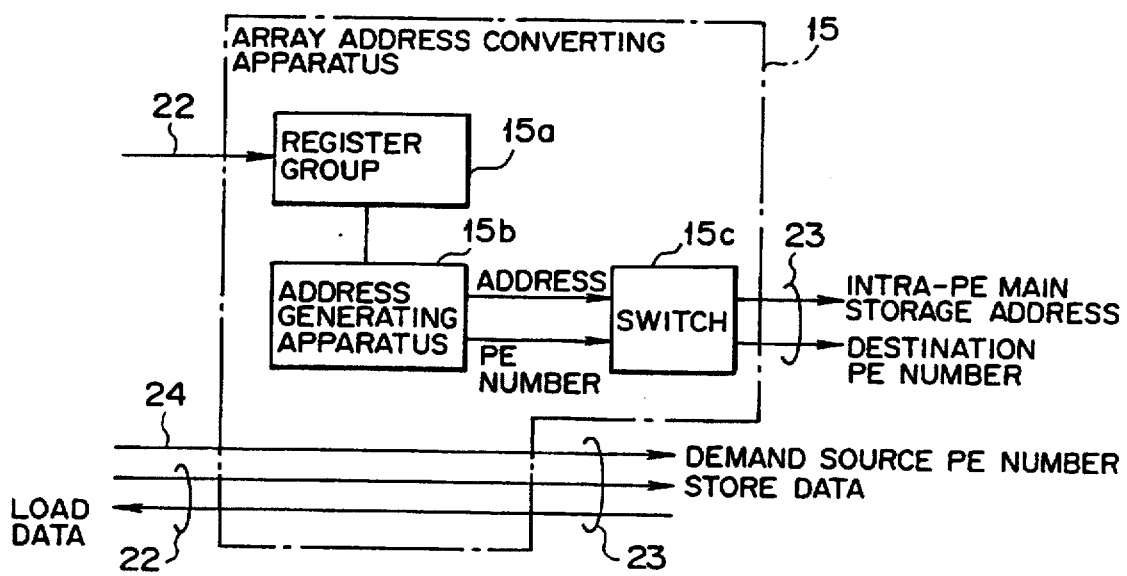
FIG. 13 is a block diagram showing a structure of an array address converting apparatus in a processor element configuring a parallel computer of a distributed storage type according to a fourth embodiment of the present invention.
Figure 14A:
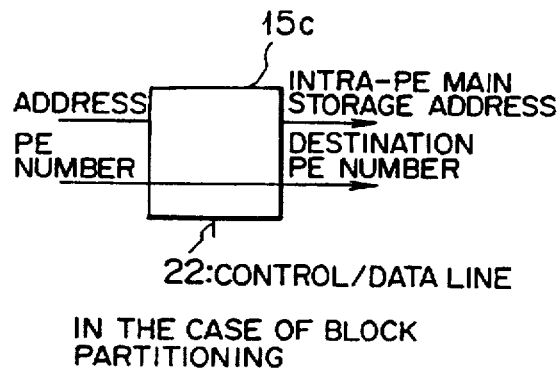
FIGS. 14(a) and 14(b) are diagrams for illustrating an operation of a switch according to the fourth embodiment.
Figure 14B:
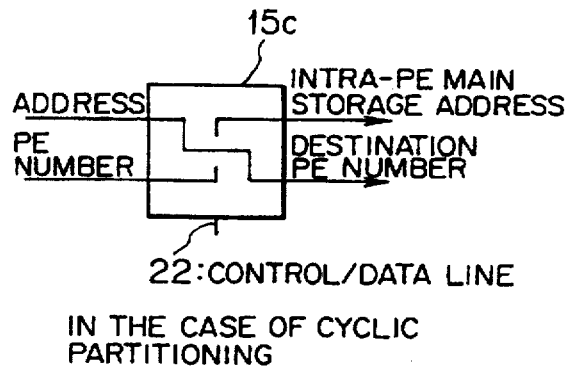

FIG. 13 is a block diagram showing a structure of an array address converting apparatus within a processor element constituting a parallel computer apparatus of a distributed storage type according to a fourth embodiment of this invention. FIGS. 14(a) and 14(b) are diagrams for illustrating an operation of a switch according to the fourth embodiment.

As shown in FIG. 13, the array address converting apparatus 15 within a PE 10 according to the fourth embodiment is configured similarly to that according to the first embodiment shown in FIG. 3. In the array address converting apparatus 15 according to the fourth embodiment, a switch 15c is provided at output lines for a PE number and an intra-PE main storage address of the address generating circuit 15b, which exchanges the PE number with the intra-PE main storage address and output them.

More specifically, the switch 15c switches a state between a state shown in FIG. 14(a) and a state shown in FIG. 14(b) on the basis of information notified over the control/data line 22. The state shown in FIG. 14(a) is to output an address and a PE number from the address generating circuit 15b as they are as a PE internal main storage address and a destination PE number. In this state, an address generation is implemented in order to get an access to array data partitioned into blocks. On the other hand, in the state shown in FIG. 14(b), an address and a PE number from the address generating circuit 15b are exchanged with each other so as to be outputted as a destination PE number and an intra-PE main storage address. In this state, an address generation is implemented in order to get an access to array data cyclicly partitioned.

Accordingly, the software notifies to the array address converting apparatus 15 by designating whether the technique for partitioning array data in a instruction field to get an access to the partitioned array data is of block partitioning or cyclic partitioning, or whether array data that is an object of an access is partitioned into blocks or cyclicly partitioned using a register.

According to a result of the notification, a state of the switch 15c in the array address converting apparatus 15 is switched into either the state shown in FIG. 14(a) or the state shown in FIG. 14(b), thereby implementing quite easily an address conversion of array data partitioned into blocks and an address conversion of array data cyclicly partitioned.

(f) Description of a Fifth Embodiment

Figure 15:
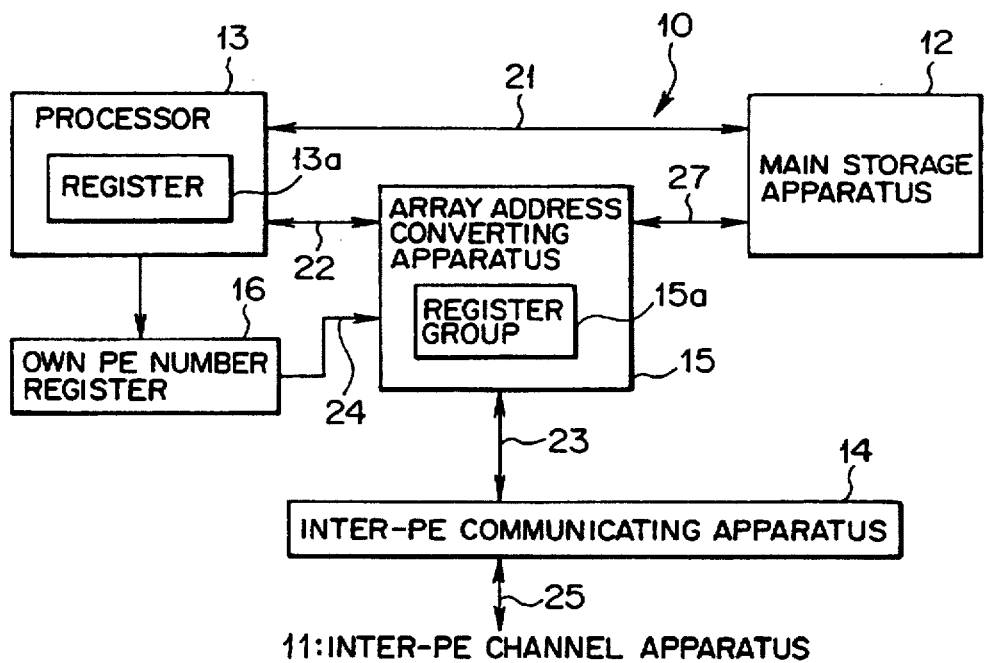
FIG. 15 is a block diagram showing a structure of a processor element in a parallel computer of a distributed storage type according to a fifth embodiment of the present invention.
Figure 16:
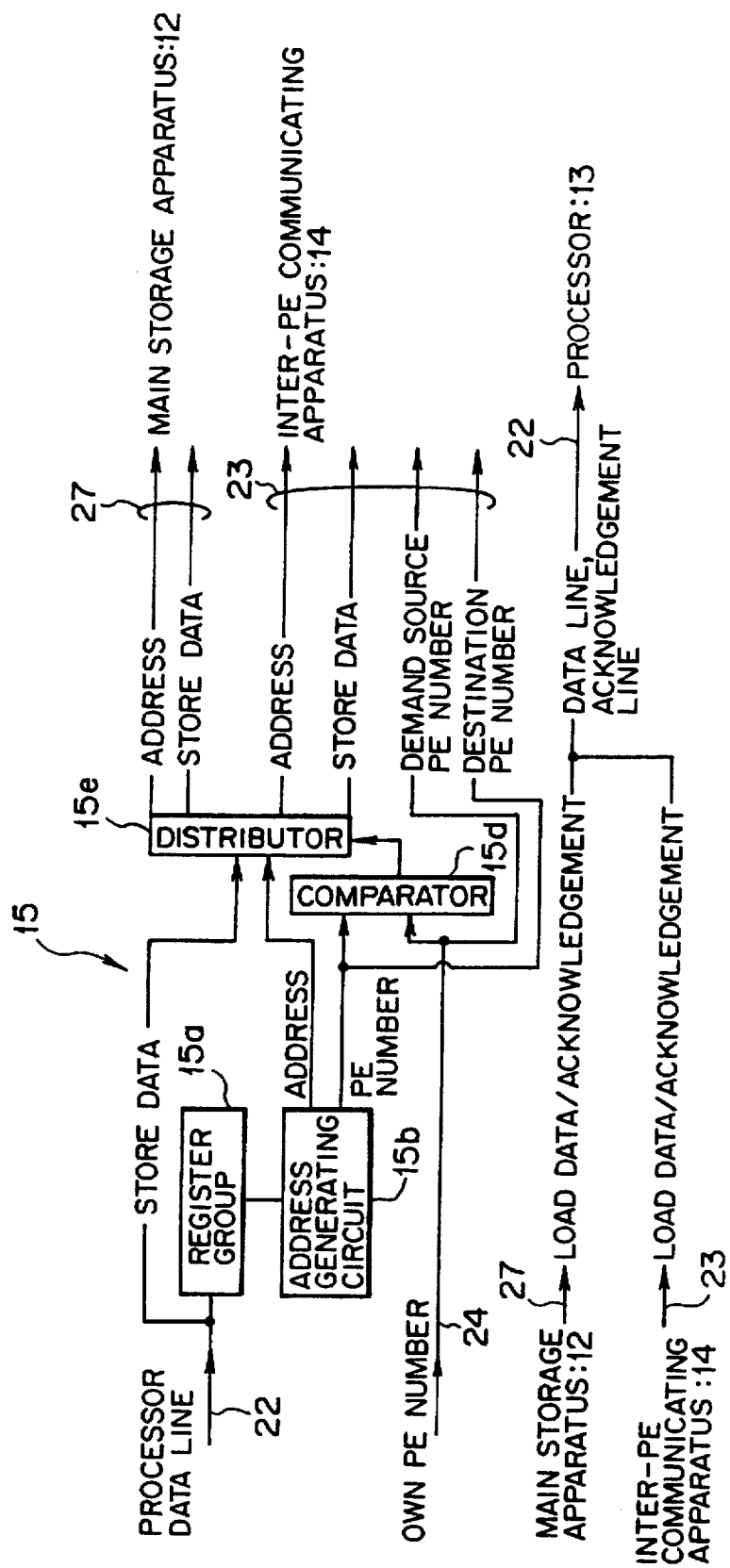
FIG. 16 is a block diagram showing a structure of the array address converting apparatus according to the fifth embodiment.

FIG. 15 is a block diagram showing a structure of a processor element in a parallel computer of a distributed storage type according to a fifth embodiment of this invention. FIG. 16 is a block diagram showing a structure of an array address converting apparatus according to the fifth embodiment.

As show in FIG. 15, a PE 10 in the parallel computer of a distributed storage type according to the fifth embodiment is configured similarly to that according to the first embodiment shown in FIG. 2. However, in the PE 10 in the parallel computer of a distributed storage type according to the fifth embodiment, the array address converting apparatus 15 and the main storage apparatus 12 are connected with each other over a control/data line 27. The control/data line 27 is used to exchange a main storage address to the main storage apparatus 12 and store data to the main storage apparatus 12, or load data and an acknowledgement from the main storage apparatus 12 between the array address converting apparatus 15 and the main storage apparatus 12 if an access destination PE is own PE, as will be described later (refer to FIG. 16).

As shown in FIG. 16, the array address converting apparatus 15 in the PE 10 according to the fifth embodiment is also configured similarly to that according to the first embodiment shown in FIG. 3. However, the array address converting apparatus 15 according to the fifth embodiment is provided with a comparator 15d and a distributor 15e in addition to the register group 15a and the address generating circuit 15b.

The comparator 15d compares a PE number generated by the address generating circuit 15b with own PE number from the register 16. The distributor 15e activates either the control/data line 23 or 27 according to a result of the comparison by the comparator 15d. In other words, the distributor 15e switches the control/data line 27 to an active state if a result of the comparison by the comparator is in agreement to connect the array address converting apparatus 15 and the main storage apparatus 12. If a result of the comparison is in disagreement, the distributor 15e switches the control/data line 23 to an active state to connect the array address converting apparatus 15 and the inter-PE communicating apparatus 14.

Next description will be of a basic operation of the fifth embodiment with the above structure. Incidentally, an operation if the array address converting apparatus 15 and the inter-PE communicating apparatus 14 are connected over the control/data line 23 since a result of the comparison by the comparator 15e results in disagreement is quite the same as the operation described in the first embodiment. For this, the description will be here made of an operation only if the array address converting apparatus 15 and the main storage apparatus 12 are connected over the control/data line 27 since a result of the comparison by the comparator 15d results in agreement. It is a matter of course that the array address converting apparatus 15 according to the fifth embodiment is also applicable to a single instruction-multiple array element access by providing a function described in the first embodiment.

(e1) Store Access

If the processor 13 executes a store instruction to use the array address converting apparatus 15, the processor 13 issues an array data access instruction to activate the array address converting apparatus 15 over the control/data line 22. At the same time, the processor 13 reads store data from the register 13a in the processor 13 and sends it to the array address converting apparatus 15 over the control/data line 22.

The array address converting apparatus 15 having received the array data access instruction starts an operation to generate a destination PE number and an intra-PE main storage address using values set in the register group 15a in the array address converting apparatus 15.

The array address converting apparatus 15 causes the comparator 15d to compare the generated PE number with own PE number from the register 16. If detecting agreement, the array address converting apparatus 15 combines the generated intra-PE main storage address with the store data from the register 13a, and sends a write demand to the main storage apparatus 12 from the distributor 15e over the control/data line 27.

When receiving an acknowledgement of completion of writing from the main storage apparatus 12 over the control/data line 27, the array address converting apparatus 15 reports the acknowledgement to the processor 13.

If a result of the comparison by the comparator 15d is in disagreement, a store access to the main storage apparatus 12 in another PE 10 is implemented quite similarly to the example described in the first embodiment.

(e1) Load Access

When the processor 13 executes a load instruction to use the array address converting apparatus, the processor 13 issues an array data access instruction to activate the array address converting apparatus 15 over the control/data line 22.

The array address converting apparatus 15 having received the array data access instruction starts an operation to generate a destination PE number and an intra-PE main storage address using values set in the register group 15a in the array address converting apparatus 15.

The array address converting apparatus 15 causes the comparator 15d to compare the generated PE number with own PE number from the register 16. If detecting agreement, the array address converting apparatus 15 sends a read instruction to the main storage apparatus 12 through the distributor 15e over the control/data line 27 using the generated PE internal main storage address.

Load data read out from the main storage apparatus 12 over the control/data line 27 by the array address converting apparatus 15 is sent to the processor 13 to be written in the register 13a in the processor 13.

If a result of the comparison by the comparator 15d results in disagreement, a load access to the main storage apparatus 12 within another PE is implemented quite similarly to the example described in the first embodiment.

According to the first embodiment, whether a destination PE is own PE or not is judged by the inter-PE communicating apparatus 14. If the destination PE is own PE, the access demand is sent back to the processor 13 via the array address converting apparatus 15, then a process depending on the access demand is performed. According to the fifth embodiment, whether an access destination PE is own PE or not is judged by the comparator 15d in the array address converter 15. If the destination PE is own PE, the access demand is directly sent to the main storage apparatus 12 within own PE 10 from the array address converting apparatus 15 so that an access to own PE may be implemented efficiently.

(g) Description of a Sixth Embodiment

Figure 17:
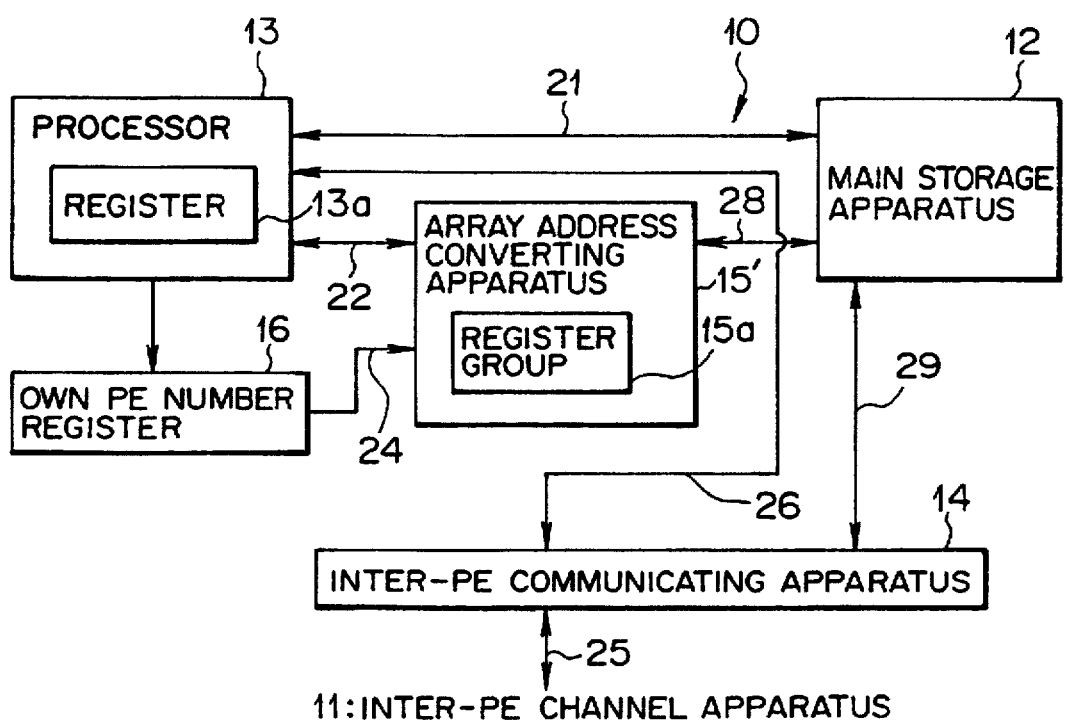
FIG. 17 is a block diagram showing a structure of a processor element in a parallel computer of a distributed storage type according to a sixth embodiment of the present invention.
Figure 18:
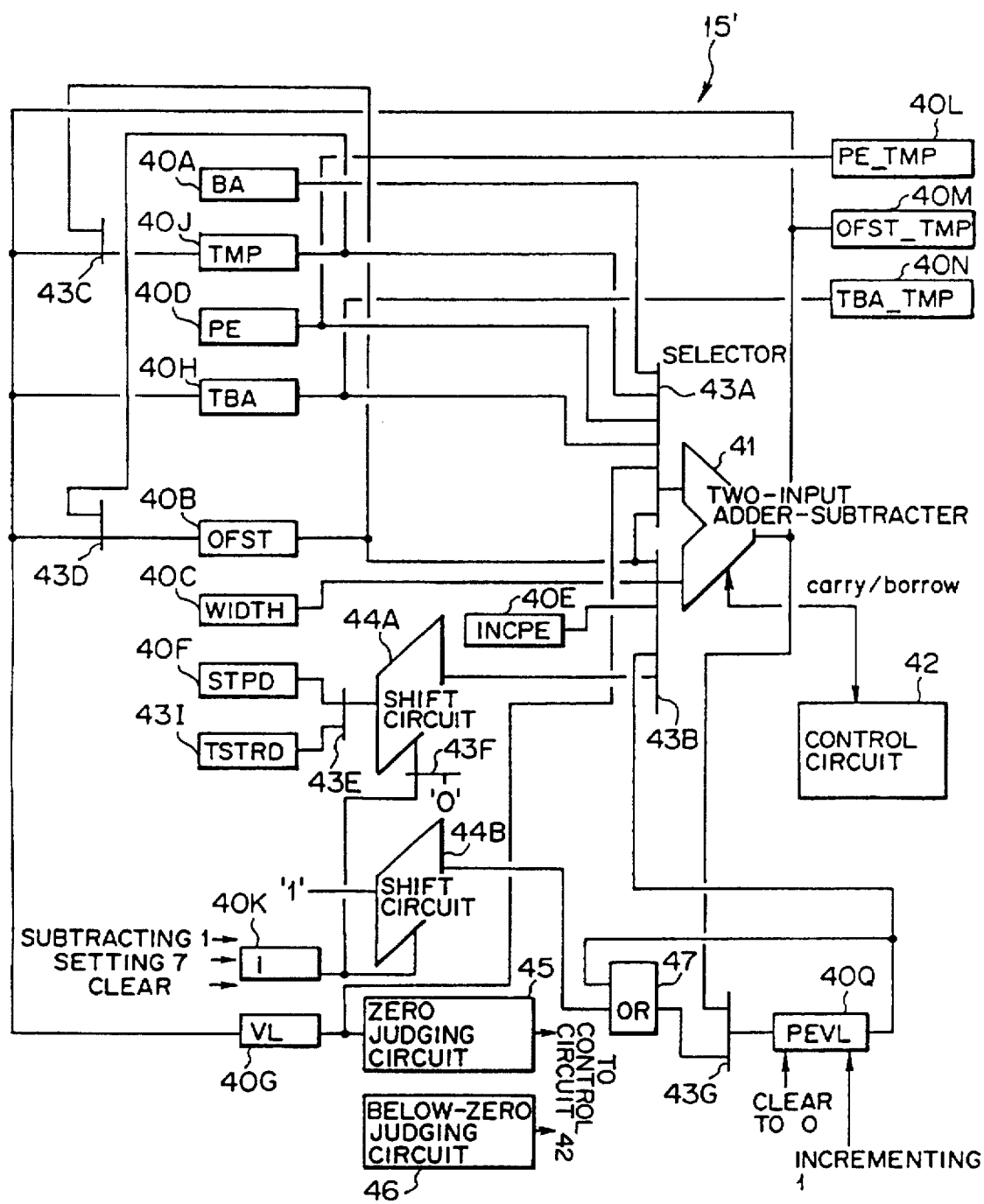
FIG. 18 is a block diagram showing a detailed structure of the array address converting apparatus according to the sixth embodiment of the present invention.

FIG. 17 is a block diagram showing a structure of a processor element in a parallel computer of a distributed storage type according to a sixth embodiment. FIG. 18 is a block diagram showing a detailed structure of an array address converting apparatus according to the sixth embodiment.

As shown in FIG. 17, a PE 10 in the parallel computer of a distributed storage type according to the sixth embodiment is configured similarly to that according to the first embodiment shown in FIG. 2. Further, an array address converting apparatus 15' in the parallel computer of a distributed storage type according to the sixth embodiment has a function substantially similar to that of the array address converting apparatus 15 described hereinbefore.

The array address converting apparatus 15' according to the sixth embodiment is configured as will be described later with reference to FIG. 18. The address converting apparatus 15' has a function as an address generating circuit (an arithmetic circuit; whose detailed structure is shown in FIG. 18) for generating PE numbers and intra-PE main storage addresses of a stride element group that is an object of an access by conducting a predetermined four-rule operation process on array data partition information and array data access information set in the register group 15a.

According to the sixth embodiment, access demand information (a store demand, a load demand) includes access object address information on the main storage apparatus 12 of an access demand source PE 10, and the register group 15a in the array address converting apparatus 15' includes registers (refer to registers 40H and 40I in FIG. 18) for retaining the access object address information ("TBA" and "TSTRD" which will be described later). The arithmetic circuit (the address generating circuit) forming the array address converting apparatus 15 has a function to generate a main storage address in the access demand source PE 10 of data that should be read out from the main storage apparatus 12 or data that should be written in the main storage apparatus 12 on the basis of various information retained in the register group 15a.

The PE 10 according to the sixth embodiment having the array address converting apparatus 15' transmits at least packet form information including a stride between the array elements and the number of elements of the stride element group excepting PE numbers and intra-PE main storage addresses generated by the array address converting apparatus 15' as access demand information (a store demand or a load demand) by the inter-PE communicating apparatus 14.

To this end, the array address converting apparatus 15' and the main storage apparatus 12 are connected with each other over a control/data line 28 according to the sixth embodiment. A packet (information in a packet form) including necessary data as access demand information such as a PE number, an intra-PE main storage address, a stride between array elements, the number of elements of a stride element group and the like generated by the array address converting apparatus 15' is transferred from the array address converting apparatus 15' to the main storage apparatus 12 over the control/data line 28 to be written therein, then generated on the main storage apparatus 12.

The inter-PE communicating apparatus 14 is controlled by the processor 13 over the control/data line 26 simiarly to that described in the third embodiment besides being connected to the main storage apparatus 12 over the control/data line 29. When activated by the processor 13, the inter-PE communicating apparatus 14 reads access demand information (a store demand, a load demand) from the main storage apparatus 12 over the control/data line 29 to transmit a packet to another PE 10. The control/data line 29 is also used to read store data to be sent to another PE 10 from the main storage apparatus 12 into the communicating apparatus 14 or write load data sent from another PE 10 from the communicating apparatus 14 into the main storage apparatus 12 between the inter-PE communicating apparatus 14 and the main storage apparatus 12.

The array address converting apparatus 15' according to the sixth embodiment is provided with registers 40A through 40N and 40P as the register group 15a as shown in FIG. 18.

The registers 40A through 40G in the register group 15a are served to retain an access base address (an array piece address) "BA", an access start offset (an index offset) "OFST", a width of a block unit "WIDTH", an access start PE number "PE", a value of an increment of the PE number "INC_PE", a stride of an the access "STRD", and the number of data to be accessed (the number of elements of a stride element group that is an object of the access) "VL (Vector Length)", respectively, similarly to the above-mentioned registers 15A through 15G.

The register 40H is served to retain a base address "TBA (Transfer buffer Base Address)" of a region in which data (store data or load data) that is an object of an access should be stored in the main storage apparatus within own PE (an access demand source PE) 10 as access object address information. The register 40I is served to retain a stride "TSTRD" representing an interval at which data (store data or load data) that is an object of an access is stored in the main storage apparatus 12 in own PE (an access demand source PE) 10 as access object address information.

The register 40J is served to temporarily retain data "TMP" generated in the course of a process in the array address converting apparatus 15'. The register 40K is served to retain a quantity of shift "i" of shift circuits 44A and 44B used in a subtracting (dividing) process.

Each of registers 40L through 40N and 40Q is served to retain data generated by the array address converting apparatus 15' as access demand information. The register 40L retains a communication destination PE number "PE_TMP", the register 40M retains a communication destination PE internal main storage address "OFST_TMP", the register 40N retains an access demand source main storage address "TBA_TMP", and the register 40Q retains the number of elements to be handled at this access "PEVL".

The array address converting apparatus 15' according to the sixth embodiment has an address generating circuit (an arithmetic circuit) made up of a two-input adder-subtracter 41, a control circuit 42, selectors 43A through 43G, shift circuits 44A and 44B, a zero judging circuit 45, a below-zero judging circuit 46 and an OR gate 47 in addition to the register group 15acomposed of the registers 40A through 40N and 40P.

The two-input adder-subtracter 41 conducts an adding process or a subtracting process on two data selected by the selectors 43A and 43B, respectively. The control circuit 42 controls a switching between the adding process and the subtracting process of the two-input adder-subtracter 42 on the basis of a "carry" signal or a "borrow" signal from the two-input adder-subtracter 41 or a result of judgement from the zero judging circuit 45 or the below-zero judging circuit 46, besides appropriately controlling a switching operation of the selectors 43A through 43G.

The selector 43A selects any one of data retained in the registers 40A, 40J, 40D, 40H, 40B and 40G, and outputs it to either one of input terminals of the two-input adder-subtracter 42. The selector 43B selects either one of data retained in the registers 40B, 40C, 40E and 40Q or an output from the shift circuit 44A, and outputs it to the other input terminal of the two-input adder-subtracter 42.

The selector 43C selects either data retained in the register 40 or an output from the two-input adder-subtracter 42, and writes it as data "TMP" into the register 40J. The selector 43D selects either data retained in the register 40J or an output from the two-input adder-subtracter 42, and writes it as data "OFST" into the register 40B.

The selector 43E selects either one of data retained in the register 40F or the register 40I, and outputs it to the shift circuit 44A. The selector 43F selects either data retained in the register 40K or "0", and gives it as a shift quantity to the shift circuit 44A. The selector 43G selects either one of an output from the two-input adder-subtracter 41 or an output from the OR gate 47, and writes it as data "PEVL" into the register 40Q.

The zero judging circuit 45 judges whether the data "VL" retained in the register 40G becomes 0 or not. The below-zero judging circuit 46 judges whether the data "VL" retained in the register 40G becomes below zero or not. The OR gate 47 calculates a logical sum of an output from the shift circuit 44B and data "PEVL" written into the register 40Q, and outputs it.

In the array address converting apparatus 15' with the above structure, the control circuit 42 controls to switch the adding operation or the subtracting operation of the two-input adder-subtracter 41, or the selecting operation of the selectors 43A through 43G, the selectors 43A and 43B select appropriate data and the selected data is inputted to the two-iput adder-subtracter 42, and the two-input adder-subtracter 42 performs an adding process or a subtracting process, whereby a PE number "PE_TMP", a PE internal main storage address "OFST_TMP", an access demand source intra-PE main storage address "TBA_TMP" and the like are calculated in a time divisional fashion.

Such operation of the control circuit 42 in the array address converting apparatus 15' is expressed in a state machine form+a C language form as shown below. This state machine generates an access demand source intra-PE main storage address at the same time, as stated before.

```
S0:   if(vl>0) goto S1
      goto S0
S1:   ofst_tmp = ba + ofst;
      pe_tmp = pe;
      pevl = 0;
      tba_tmp = tba;
      i = 7;
      goto S2;
S2:   tmp = ofst + (strd << i);
      goto S3;
S3:   if(tmp<= width) then
         pevl = pevl l (1 << i);
         ofst = tmp;
         goto S4;
      endif
      if (i > 0) then
         i = i - 1;
         goto S3;
      endif
      goto S5;
S4:   tba = tba + (tstrd << 1);
      if (i > 0) then
         i = i - 1;
         goto S3;
      endif
      goto S5;
S5:   ofst = ofst + strd;
      goto S6;
S6:   ofst = ofst - width;
      if (osft >= 0) goto S7;
      goto S8;
S7:   pe = pe +inc_pe;
      goto S6;
S8:   ofst = ofst + width
      goto S9;
S9:   pevl = pevl + 1;
```

```
            goto S10;
    S10:    vl = vl - pevl;
            if (vl < 0) goto S11;
            goto S12;
    S11:    pevl = pevl + vl;
            goto S12;
    S12:    tba = tba + tstrd;
            goto S13;
    S13:    store packet (pe__tmp,ofst__tmp, strd, pevl, tba__tmp,
    tstrd)
            goto S0;
```

By the above operation, a communication destination PE number "pe__tmp", a communication destination intra-PE main storage address "ofst__tmp", a communication destination intra-PE access stride "strd", the number of elements "pevl", an access demand source intra-PE main storage address "tba__tmp", an access demand source intra-PE access stride "tstrd" are assembled into a packet as access demand information and transmitted from the access demand source PE 10 to the communication destination PE 10.

Such access demand information causes the following transferring process.

(f1) In the case of a reading operation (a load access)

As to i=0 through (pevl-1), data at an address=["ofst__tmp"+"strd"×i] is read out from the main storage apparatus 12 of a PE 10 indicated by the communication destination PE number "pe__tmp", and the read data is written into a region at an address=["tba__tmp"+"tstrd"×i] in the main storage apparatus 12 in the access demand source PE 10.

(f2) In the case of a writing operation (a store access)

As to i=0 through (pevl-1), data at an address=["tba__tmp"+"tstrd"×i] is read out from the main storage apparatus 12 in the access demand source PE 10, and the read data is written into a region at an address=["ofst tmp"+"strd"×i] in the main storage apparatus 12 in a PE 10 indicated by the communication destination PE number "pe tmp".

According to the sixth embodiment of this invention, it is unnecessary to generate a PE number and an intra-PE main storage address of each array element of an array element group that is an object of an access by the array address converting apparatus 15' and transmit them by the communicating apparatus 14 if multiple array elements are accessed from the processor 13 with a single instruction, but it is possible to collect access demand information to be transmitted to a communication destination PE 10 and transmit it in a packet form.

If the parallel computer according to the sixth embodiment retains PE numbers and intra-PE main storage addresses in a virtual address mode, it is necessary to conduct an address conversion on an output of the array address converting apparatus 15 similarly to the second embodiment described hereinbefore. To comply with the virtual address mode, the inter-PE communicating apparatus 14 has the PE number converting apparatus 14a and the intra-PE address converting apparatus 14b.

(h) Description of a Seventh Embodiment

FIG. 19 is a block diagram showing a structure of a processor element in a parallel computer of a distributed storage type according to a seventh embodiment of this invention. As shown in FIG. 19, a PE 10 in the parallel computer of a distributed storage type according to the seventh embodiment is configured similarly to that according to the sixth embodiment shown in FIG. 17. In the parallel computer of a distributed storage type according to the seventh embodiment, the control/data line 26 connecting the processor 13 and the inter-PE communicating apparatus 14 and the control/data line 28 connecting the array address converting apparatus 15' and the main storage apparatus 12 are omitted. Instead of these, the array address converting apparatus 15' and the inter-PE communicating apparatus 14 are connected over a control/data line 23A.

According to the sixth embodiment, access demand information generated in the array address converting apparatus 15' is written in the main storage apparatus 12 and put into a packet. However, in the PE 10 according to the seventh embodiment, access demand information is directly written in the inter-PE communicating apparatus 14 from the array address converting apparatus 15' over the control/data line 23A and put into a packet. Therefore, the communicating apparatus 14 directly reads data from the main storage apparatus 12 or directly writes data into the main storage apparatus 12 over the control/data line 29 on the basis of the access demand information from the array address converting apparatus 15'.

What is claimed is:

1. A parallel computer of a distributed storage type having plural processor elements and a channel communicably connecting said plural processor elements, which partitions and stores array data in said plural processor elements to conduct a process on said array data while transferring said array data among said plural processor elements over said channel, said parallel computer of a distributed storage type comprising:

each of said processor elements comprising:
a storage apparatus for storing data;
a processing apparatus for conducting a process on data on said storage apparatus;
a communicating apparatus for communicating with another processor element over said channel; and
an array address converting apparatus for generating a number of a processor element retaining an array element that is an object of an access and an address on storage apparatus of said array element within a processor element retaining said array element on the basis of array data partition information set in response to a control instruction from said processing apparatus and array data access information sent from said processing apparatus in response to an array data access instruction executed by said processing apparatus;

if said array data is partitioned into blocks having the same width of said plural processor elements and said processing apparatus accesses to one array element of said array data, said array address converting apparatus comprising:
a register group in which a size of one element of the array data, a number of array dimensions, a region of array indexes in each dimension, a manner of partitioning in each dimension, a number of partitions in each dimension, a value of an increment of a processor element number in each dimension and an address on storage apparatus of a partitioned array piece are set as said array data partition information, along with an identifier of array data to be an object of an access and an index offset from a leading element of the array data to an array element that is an object of an access as said array data access information; and
an arithmetic circuit for generating a processor element number and an address on storage apparatus of the array element that is an object of the access by conducting a predetermined four-rule arithmetic operation on said array data partition information and said array data access information set in said register group;

if said processing apparatus makes a store demand for an array element of said array data, said processing apparatus directly notifying a processor element number and an address on storage apparatus generated by said array address converting apparatus to said communicating apparatus to activate said communicating apparatus, and said communicating apparatus giving the address on storage apparatus generated by said array address converting apparatus to a processor element having the processor element number generated by said array address converting apparatus to transmit the store demand for said array element thereto;

if said processing apparatus makes a load demand for an array element of said array data, said processing apparatus directly notifying a processor element number and an address on storage apparatus generated by said array address converting apparatus to said communicating apparatus to activate said communicating apparatus, and said communicating apparatus giving the address on storage apparatus generated by said array address converting apparatus to a processor element having the processor number generated by said array address converting apparatus to transmit the load demand for said array element thereto besides writing load data transmitted in response to said load demand into a register in said processing apparatus;

said communicating apparatus further operating asynchronously with said processing apparatus to read corresponding load data from said storage apparatus in response to a load demand from another processor element and transferring the load data to said another processor element in response to said load demand.

2. The parallel computer of a distributed storage type according to claim 1, wherein said arithmetic circuit configuring said array address converting apparatus comprises a two-input adder-subtracter, a control circuit for controlling switching between an adding operation and a subtracting operation of said two-input adder-subtracter, and a selector for selecting data retained in said register group to output the selected data to said two-input adder-subtracter.

3. The parallel computer of a distributed storage type according to claim 2, wherein said register group configuring said array address converting apparatus is also used as a register for temporarily retaining generation progress data of a processor element number and an address on storage apparatus by said arithmetic circuit.

4. The parallel computer of a distributed storage type according to claim 1, wherein said communicating apparatus comprises:

a processor element number converting apparatus having a hardware table for storing correspondence between a virtual processor element number and an actual processor element number, and regarding a processor element number generated by said array address converting apparatus as a virtual processor element number to convert said virtual processor element number into the actual processor element number by retrieving said hardware table; and a processor element internal address converting apparatus for regarding an address on storage apparatus received from another processor element as a virtual address on storage apparatus to convert said virtual address on storage apparatus into an actual address on storage apparatus within own processor element.

5. The parallel computer of a distributed storage type according to claim 4, wherein said register group configuring said array address converting apparatus is also used as a register for temporarily retaining generation progress data of a processor element number and an address on storage apparatus by said arithmetic circuit.

6. The parallel computer of a distributed storage type according to claim 1, wherein said processing apparatus reads out a processor element number and an address on storage apparatus generated by said array address converting apparatus from said array address converting apparatus, and activates said communicating apparatus on the basis of the processor element number and the address on storage apparatus read out to control transmission of said store demand or said load demand by said communicating apparatus.

7. The parallel computer of a distributed storage type according to claim 6, wherein said register group configuring said array address converting apparatus is also used as a register for temporarily retaining generation progress data of a processor element number and an address on storage apparatus by said arithmetic circuit.

8. The parallel computer of a distributed storage type according to claim 1, wherein said array address converting apparatus comprises a switch for exchanging a processor element number with an address on storage apparatus generated by said array address converting apparatus and outputs them.

9. The parallel computer of a distributed storage type according to claim 8, wherein said register group configuring said array address converting apparatus is also used as a register for temporarily retaining generation progress data of a processor element number and an address on storage apparatus by said arithmetic circuit.

10. The parallel computer of a distributed storage type according to claim 1, wherein said register group configuring said array address converting apparatus is also used as a register for temporarily retaining generation progress data of a processor element number and an address on storage apparatus by said arithmetic circuit.

11. A parallel computer of a distributed storage type having plural processor elements and a channel communicably connecting said plural processor elements, which partitions and stores array data in said plural processor elements to conduct a process on said array data while transferring said array data among said plural processor elements over said channel, said parallel computer of a distributed storage type comprising:

each of said processor elements comprising:
a storage apparatus for storing data;
a processing apparatus for conducting a process on data on said storage apparatus;
a communicating apparatus for communicating with another processor element over said channel; and
an array address converting apparatus for generating a number of a processor element retaining an array element that is an object of an access and an address on storage apparatus of said array element within a processor element retaining said array element on the basis of array data partition information set in response to a control instruction from said processing apparatus and array data access information sent from said processing apparatus in response to an array data access instruction executed by said processing apparatus;

if said array data is partitioned into blocks having the same width of said plural processor elements and said processing apparatus accesses to a stride element group, that is, plural array elements arranged at predetermined intervals, of said array data, said array address converting apparatus comprising:

a register group in which a size of one element of array data, a number of array dimensions, a region of array indexes in each dimension, a manner of partitioning in each dimension, a number of partitions in each dimension, a value of an increment of the processor element number in each dimension, an address on storage apparatus of a partitioned array piece, a stride of said stride element group and the number of elements of said stride element group are set as said array data partition information along with an identifier of array data to be an object of an access and an index offset from a leading element of the array data to a leading element of said stride element group as said array data access information; and an arithmetic circuit for successively generating a processor element number and an address on storage apparatus of each of array elements of the stride element group that is an object of said access by conducting a predetermined four-rule arithmetic operation on the array data partition information and the array data access information set in the register group;

if said processing apparatus makes a store demand for a stride element group of said array data, said processing apparatus directly notifying the processor element number and the address on storage apparatus generated by said array address converting apparatus to said communicating apparatus to activate said communicating apparatus, said communicating apparatus giving the address on storage apparatus generated by said array address converting apparatus to a processor element having the processor element number generated by said array address converting apparatus to transmit the store demand for said stride element group;

if said processing apparatus makes a load demand for a stride element group of said array data, said processing apparatus directly notifying a processor element number and an address on storage apparatus generated by said array address converting apparatus to said communicating apparatus to activate said communicating apparatus, said communicating apparatus giving the address on storage apparatus generated by said array address converting apparatus to a processor element having the processor element number generated by said array address converting apparatus to transmit the load demand for said stride element group besides writing load data transferred in response to said load demand into a register in said processing apparatus;

said communicating apparatus further operating asynchronously with said processing apparatus to read corresponding load data from said storage apparatus in response to a load demand from another processor element and transferring the load data to said another processor element in response to said load demand.

12. The parallel computer of a distributed storage type according to claim 11, wherein said arithmetic circuit configuring said array address converting apparatus comprises a two-input adder-subtracter, a control circuit for controlling switching between an adding operation and a subtracting operation of said two-input adder-subtracter, and a selector for selecting data retained in said register group to output the selected data to said two-input adder-subtracter.

13. The parallel computer of a distributed storage type according to claim 12, wherein said register group configuring said array address converting apparatus is also used as a register for temporarily retaining generation progress data of a processor element number and an address on storage apparatus by said arithmetic circuit.

14. The parallel computer of a distributed storage type according to claim 13, wherein said communicating apparatus comprises:

a processor element number converting apparatus having a hardware table for storing correspondence between a virtual processor element number and an actual processor element number, and regarding a processor element number generated by said array address converting apparatus as a virtual processor element number to convert said virtual processor element number into the actual processor element number by retrieving said hardware table; and a processor element internal address converting apparatus for regarding an address on storage apparatus received from another processor element as a virtual address on storage apparatus to convert said virtual address on storage apparatus into an actual address on storage apparatus within own processor element.

15. The parallel computer of a distributed storage type according to claim 14, wherein said register group configuring said array address converting apparatus is also used as a register for temporarily retaining generation progress data of a processor element number and an address on storage apparatus by said arithmetic circuit.

16. The parallel computer of a distributed storage type according to claim 13, wherein said processing apparatus reads out a processor element number and an address on storage apparatus generated by said array address converting apparatus from said array address converting apparatus, and activates said communicating apparatus on the basis of the processor element number and the address on storage apparatus read out to control transmission of said store demand or said load demand by said communicating apparatus.

17. The parallel computer of a distributed storage type according to claim 16, wherein said register group configuring said array address converting apparatus is also used as a register for temporarily retaining generation progress data of a processor element number and an address on storage apparatus by said arithmetic circuit.

18. The parallel computer of a distributed storage type according to claim 13, wherein said array address converting apparatus comprises a switch for exchanging a processor element number with an address on storage apparatus generated by said array address converting apparatus and outputs them.

19. The parallel computer of a distributed storage type according to claim 18, wherein said register group configuring said array address converting apparatus is also used as a register for temporarily retaining generation progress data of a processor element number and an address on storage apparatus by said arithmetic circuit.

20. The parallel computer of a distributed storage type according to claim 11, wherein said register group configuring said array address converting apparatus is also used as a register for temporarily retaining generation progress data of a processor element number and an address on storage apparatus by said arithmetic circuit.

21. A parallel computer of a distributed storage type having plural processor elements and a channel communicably connecting said plural processor elements, which partitions and stores array data in said plural processor elements to conduct a process on said array data while transferring said array data among said plural processor elements over said channel, said parallel computer of a distributed storage type comprising:

each of said processor elements comprising:
a storage apparatus for storing data;
a processing apparatus for conducting a process on data on said storage apparatus;
a communicating apparatus for communicating with another processor element over said channel; and
an array address converting apparatus for generating a number of a processor element retaining an array element that is an object of an access and an address on storage apparatus of said array element within a processor element retaining said array element on the basis of array data partition information set in response to a control instruction from said processing apparatus and array data access information sent from said processing apparatus in response to an array data access instruction executed by said processing apparatus;

if said array data is partitioned into blocks having the same width of said plural processor elements and said processing apparatus accesses to a stride element group, that is, plural array elements arranged at predetermined intervals, of said array data, said array address converting apparatus comprising:
a register group in which a size of one element of array data, a number of array dimensions, a region of array indexes in each dimension, a manner of partitioning in each dimension, a number of partitions in each dimension, a value of an increment of the processor element number in each dimension, an address on storage apparatus of a partitioned array piece, a stride of said stride element group and the number of elements of said stride element group are set as said array data partition information along with an identifier of array data to be an object of an access and an index offset from a leading element of the array data to a leading element of said stride element group as said array data access information; and
an arithmetic circuit for successively generating a processor element number and an address on storage apparatus of each of array elements of the stride element group that is an object of said access by conducting a predetermined four-rule arithmetic operation process on said array data partition information and said array data access information set in said register group;

if said processing apparatus makes a store demand for a stride element group of said array data, said processing apparatus directly notifying a processor element number and an address on storage apparatus generated by said array address converting apparatus to said communicating apparatus to activate said communicating apparatus, said communicating apparatus giving the address on storage apparatus generated by said array address converting apparatus to a processor element having the processor element number generated by said array address converting apparatus to transmit the store demand for said stride element group thereto;

if said processing apparatus makes a load demand for a stride element group of said array data, said processing apparatus directly notifying a processor element number and an address on the storage apparatus generated by said array address converting apparatus to said communicating apparatus to activate said communicating apparatus, said communicating apparatus giving the address on storage apparatus generated by said array address converting apparatus to a processor element having the processor element number generated by said array address converting apparatus to transmit the load demand for said stride element group besides writing load data transferred in response to said load demand into a register in said processing apparatus;

said array address converting apparatus further transferring packet form information including a stride of said stride element group and the number of elements of said stride element group along with the address on storage apparatus generated by said array address converting apparatus to said communicating apparatus;

said communicating apparatus operating asynchronously with said processing apparatus besides transferring data in a packet form to another processor element to read out corresponding load data from said storage apparatus in response to a load demand from another processor element to transfer the load data to said another processor element in response to the load demand.

22. The parallel computer of a distributed storage type according to claim 21, wherein said packet form information as access demand information includes an address of a leading element of said stride element group on said storage apparatus of said access demand source processor element and a stride of said stride element group that are access object address information on said storage apparatus of said access demand source processor element;

said register group configuring said array address converting apparatus includes a register for retaining said access object address information; and said arithmetic circuit configuring said array address converting apparatus generates an address on storage apparatus of the access demand source processor element of data that should be read out from said storage apparatus or data that should be written into said storage apparatus on the basis of said access object address information retained in said register group.

23. The parallel computer of a distributed storage type according to claim 22, wherein said arithmetic circuit configuring said array address converting apparatus comprises a two-input adder-subtracter, a control circuit for controlling switching between an adding operation and a subtracting operation of said two-input adder-subtracter, and a selector for selecting data retained in said register group to output the selected data to said two-input adder-subtracter.

24. The parallel computer of a distributed storage type according to claim 23, wherein said register group configuring said array address converting apparatus is also used as a register for temporarily retaining generation progress data of a processor element number and an address on storage apparatus by said arithmetic circuit.

25. The parallel computer of a distributed storage type according to claim 22, wherein said register group configuring said array address converting apparatus is also used as a register for temporarily retaining generation progress data of a processor element number and an address on storage apparatus by said arithmetic circuit.

26. The parallel computer of a distributed storage type according to claim 22, wherein said communicating apparatus comprises:

a processor element number converting apparatus having a hardware table for storing correspondence between a virtual processor element number and an actual processor element number, and regarding a processor element number generated by said array address converting apparatus as a virtual processor element number to convert said virtual processor element number into the actual processor element number by retrieving said hardware table; and a processor element internal address converting apparatus for regarding an address on storage apparatus received from another processor element as a virtual address on storage apparatus to convert said virtual address on storage apparatus into an actual address on storage apparatus within own processor element.

27. The parallel computer of a distributed storage type according to claim 26, wherein said register group configuring said array address converting apparatus is also used as a register for temporarily retaining generation progress data of a processor element number and an address on storage apparatus by said arithmetic circuit.

28. The parallel computer of a distributed storage type according to claim 22, wherein said processing apparatus reads out a processor element number and an address on storage apparatus generated by said array address converting apparatus from said array address converting apparatus, and activates said communicating apparatus on the basis of the processor element number and the address on storage apparatus read out to control transmission of said store demand or said load demand by said communicating apparatus.

29. The parallel computer of a distributed storage type according to claim 28, wherein said register group configuring said array address converting apparatus is also used as a register for temporarily retaining generation progress data of a processor element number and an address on storage apparatus by said arithmetic circuit.

30. The parallel computer of a distributed storage type according to claim 22, wherein said array address converting apparatus writes said packet form information into said storage apparatus; and said communicating apparatus reads out said packet form information from said storage apparatus to transfer said packet form information read out to another processor element.

31. The parallel computer of a distributed storage type according to claim 30, wherein said register group configuring said array address converting apparatus is also used as a register for temporarily retaining generation progress data of a processor element number and an address on storage apparatus by said arithmetic circuit.

32. The parallel computer of a distributed storage type according to claim 21, wherein said arithmetic circuit configuring said array address converting apparatus comprises a two-input adder-subtracter, a control circuit for controlling switching between an adding operation and a subtracting operation of said two-input adder-subtracter, and a selector for selecting data retained in said register group to output the selected data to said two-input adder-subtracter.

33. The parallel computer of a distributed storage type according to claim 32, wherein said register group configuring said array address converting apparatus is also used as a register for temporarily retaining generation progress data of a processor element number and an address on storage apparatus by said arithmetic circuit.

34. The parallel computer of a distributed storage type according to claim 21, wherein said communicating apparatus comprises:

a processor element number converting apparatus having a hardware table for storing correspondence between a virtual processor element number and an actual processor element number, and regarding a processor element number generated by said array address converting apparatus as a virtual processor element number to convert said virtual processor element number into the actual processor element number by retrieving said hardware table; and a processor element internal address converting apparatus for regarding an address on storage apparatus received from another processor element as a virtual address on storage apparatus to convert said virtual address on storage apparatus into an actual address on storage apparatus within own processor element.

35. The parallel computer of a distributed storage type according to claim 34, wherein said register group configuring said array address converting apparatus is also used as a register for temporarily retaining generation progress data of a processor element number and an address on storage apparatus by said arithmetic circuit.

36. The parallel computer of a distributed storage type according to claim 21, wherein said processing apparatus reads out a processor element number and an address on storage apparatus generated by said array address converting apparatus from said array address converting apparatus, and activates said communicating apparatus on the basis of the processor element number and the address on storage apparatus read out to control transmission of said store demand or said load demand by said communicating apparatus.

37. The parallel computer of a distributed storage type according to claim 36, wherein said register group configuring said array address converting apparatus is also used as a register for temporarily retaining generation progress data of a processor element number and an address on storage apparatus by said arithmetic circuit.

38. The parallel computer of a distributed storage type according to claim 21, wherein said register group configuring said array address converting apparatus is also used as a register for temporarily retaining generation progress data of a processor element number and an address on storage apparatus by said arithmetic circuit.

* * * * *